United States Patent
Iwane

(10) Patent No.: US 7,804,424 B2
(45) Date of Patent: Sep. 28, 2010

(54) AUTOMATIC GUIDE APPARATUS FOR TRAFFIC FACILITIES

(75) Inventor: Waro Iwane, Hokkaido (JP)

(73) Assignee: Iwane Laboratories, Ltd., Hokkaido (JP)

( * ) Notice: Subject to any disclaimer, the term of this patent is extended or adjusted under 35 U.S.C. 154(b) by 801 days.

(21) Appl. No.: 10/519,919

(22) PCT Filed: Jul. 3, 2003

(86) PCT No.: PCT/JP03/08465

§ 371 (c)(1),
(2), (4) Date: Sep. 7, 2005

(87) PCT Pub. No.: WO2004/006207

PCT Pub. Date: Jan. 15, 2004

(65) Prior Publication Data

US 2006/0087453 A1    Apr. 27, 2006

(30) Foreign Application Priority Data

Jul. 3, 2002 (JP) ............................ 2002-194283

(51) Int. Cl.
*G08G 1/07* (2006.01)

(52) U.S. Cl. .............. 340/916; 340/988; 340/995.13; 340/995.17; 340/995.2; 701/200; 701/206; 701/207; 701/117

(58) Field of Classification Search ............ 340/916, 340/988, 933, 995.1, 995.13, 995.17, 995.2, 340/436, 903, 995.24, 435, 905; 701/200, 701/206, 207, 208, 223, 301, 117, 45, 96; 381/1; 382/190, 209
See application file for complete search history.

(56) References Cited

U.S. PATENT DOCUMENTS

| | | | | |
|---|---|---|---|---|
| 5,844,505 A * | 12/1998 | Van Ryzin | .................. | 340/988 |
| 5,987,152 A * | 11/1999 | Weisser | ..................... | 382/104 |
| 6,560,529 B1 * | 5/2003 | Janssen | ..................... | 701/200 |
| 6,756,916 B2 * | 6/2004 | Yanai | .......................... | 340/936 |
| 6,836,724 B2 * | 12/2004 | Becker et al. | ............... | 701/200 |
| 7,194,347 B2 * | 3/2007 | Harumoto et al. | ............. | 701/45 |
| 2005/0226508 A1 * | 10/2005 | Gotohda | ..................... | 382/190 |
| 2006/0228000 A1 * | 10/2006 | Miyajima et al. | .......... | 382/104 |

FOREIGN PATENT DOCUMENTS

JP         11-271074 A         10/1999

(Continued)

*Primary Examiner*—Toan N Pham
(74) *Attorney, Agent, or Firm*—Sughrue Mion, PLLC

(57) ABSTRACT

There is provided an automatic guide apparatus for traffic facilities capable of automatically recognizing the circumstances around the traffic facilities for motor vehicles or the like which change momentarily to automatically guide the operating route of the road or the like. In the automatic guide apparatus for traffic facilities 1, image data, voice data or the like in connection with the circumstances around the traffic facilities to be operated obtained by the input device 2 are compared with image data, voice data or the like stored in advance in a database by the comparison device 4. Where the results obtained by comparing the image data, voice data or the like are coincided, the contents of the data are recognized by the recognition device 5, and the recognized results are informed to an operator or the like in a letter or character, an image, a voice or the like by the output device 6.

20 Claims, 19 Drawing Sheets

FOREIGN PATENT DOCUMENTS

| | | |
|---|---|---|
| JP | 2000-222681 A | 8/2000 |
| JP | 2000-283772 A | 10/2000 |
| JP | 2000-293670 A | 10/2000 |
| JP | 2001-289631 A | 10/2001 |
| JP | 2002-139327 A | 5/2002 |
| JP | 2002-163643 A | 6/2002 |

* cited by examiner

Fig. 8
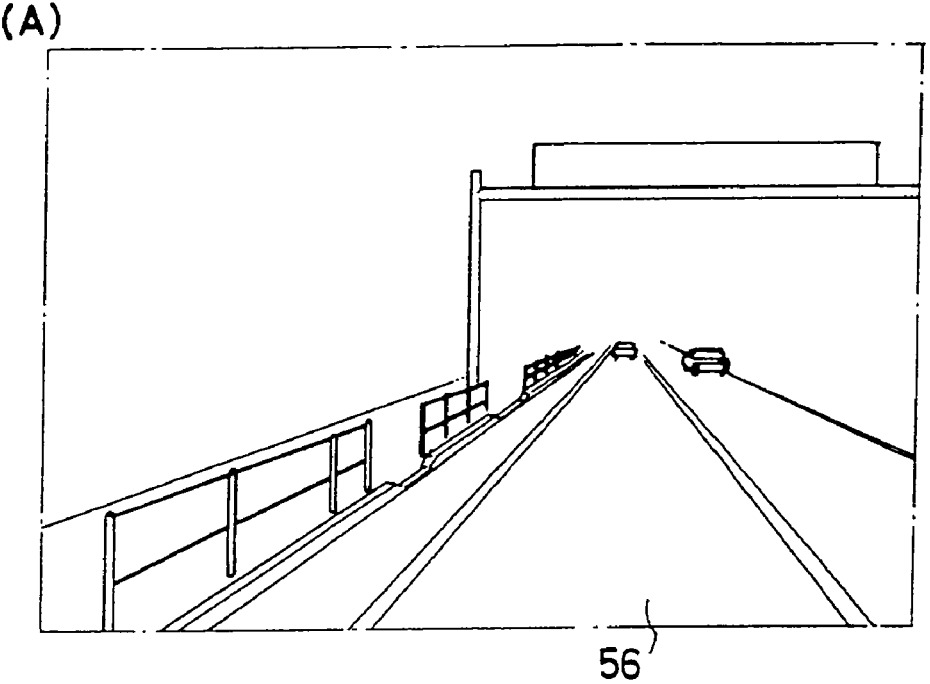
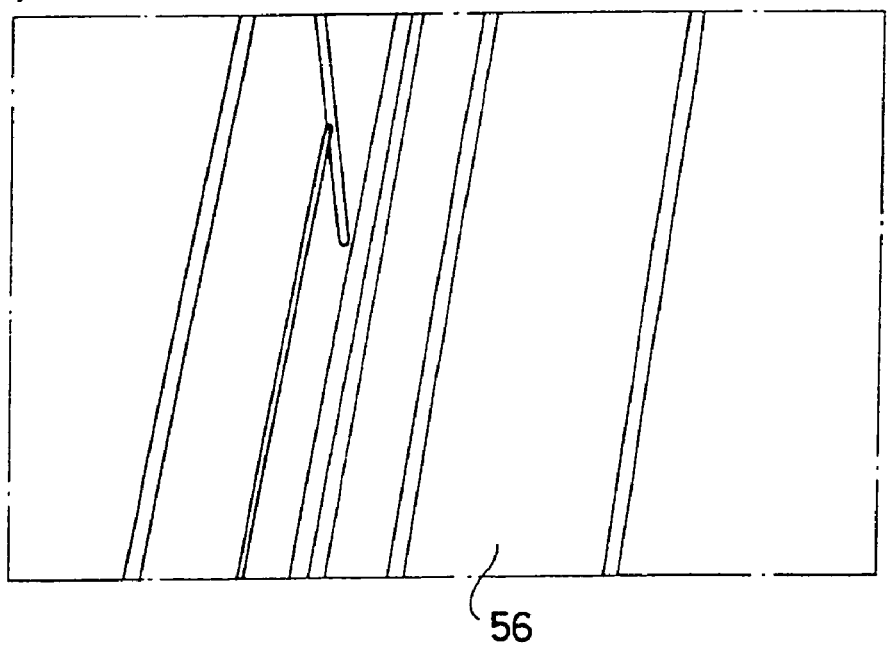

Fig. 9
(A)
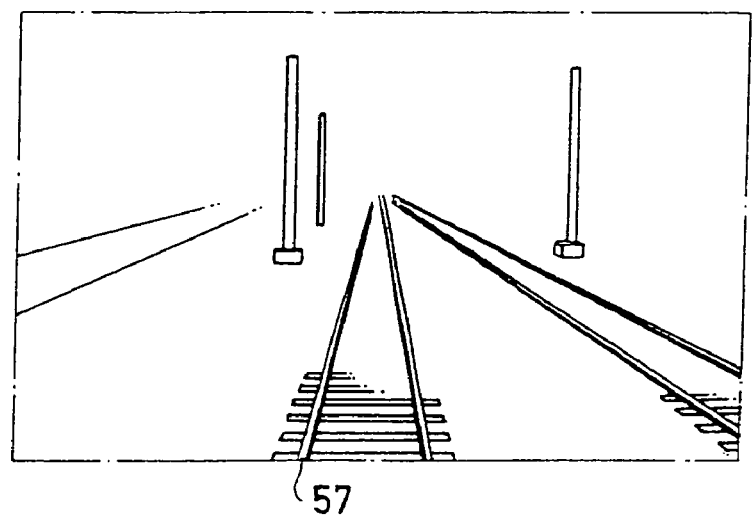
(B)
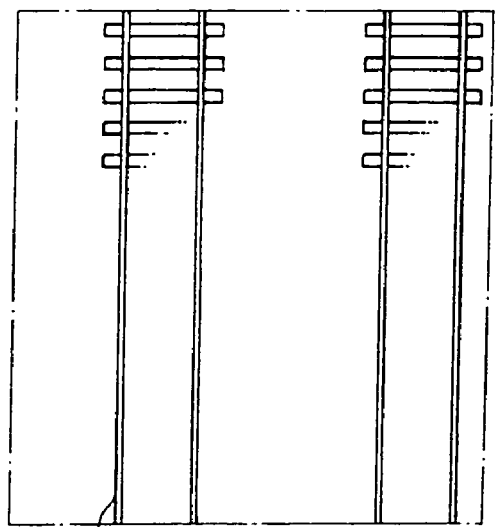

57

AUTOMATIC GUIDE APPARATUS FOR TRAFFIC FACILITIES

TECHNICAL FIELD

The present invention relates to an automatic guide apparatus for traffic facilities for automatically recognizing the circumstances with respect to traffic facilities to be operated, informing an operator or the like of the circumstances in a letter or a character, an image, a voice or the like, guiding an operating route, and directing adequate behavior in the operation.

BACKGROUND ART

Heretofore, there has not been present an apparatus for automatically reading out marks, signs or the like provided on the road, recognizing the meaning or contents thereof, recognizing the circumstances of vehicles advancing side by side, passing vehicles, opposing vehicles and the like which travel on the roads, automatically informing a driver or an occupant of the circumstances with respect to the vehicles, and guiding the road. Accordingly, an occupant sat on the assistant's seat reads marks, signs or the like provided on the road, informs the driver of the contents thereof, or looks at vehicles advancing side by side, passing vehicles, opposing vehicles and the like which travel on the roads to inform the driver of the circumstances with respect to the own vehicle, or as the case may be, directs him (her) of action such as stepping a brake.

On the other hand, with the recent advancement of the automatic driving technique, an apparatus has been put to practical used in which a white line provided on the road shoulder is detected, and a motor vehicle is automatically traveled along the white line. Further, there have been studied an apparatus in which a distance to a preceding vehicle is detected by some means, and the motor vehicle is automatically traveled while keeping a fixed distance, an apparatus in which the motor vehicle is automatically traveled in accordance with the beacon provided on the road, and other apparatuses, which will be soon put to practical use (for example, see Japanese Patent Laid-Open No. 162285/1998 Publication).

In any way, there have not been present the apparatus for recognizing marks, signs or the like provided on the road, or the vehicles advancing side by side, passing vehicles, opposing vehicles and the like which travel on the roads, and automatically guiding the road along which the motor vehicle travels.

Such a technique as noted above with respect to prior art is also similarly applied to, not only the vehicles traveling on the road such as a motor vehicle, but also vehicles traveling on the track such as trains, and the body of an airplane navigating the space, or the body of a ship navigating the sea.

DISCLOSURE OF INVENTION

For automatically recognizing marks, sings or the like provided on the road, and the circumstances with respect to the own vehicles such as vehicles advancing side by side, passing vehicles, opposing vehicles and the like which travel on the roads, it is necessary to take in, in a lapse of time, the circumstances around the own vehicle as an image, a voice or the like and process the image data, voice data or the like taken in at high speeds.

However, for automatically recognizing the circumstances around the own vehicle which change momentarily to automatically guide the road, it is necessary to process an enormous quantity of image data, voice data and the like, but it is so difficult to process them at high speeds. Further, it is absolutely impossible to process them at real time.

Such a problem as noted above similarly occurs in, not only the vehicles traveling on the road such as a motor vehicle, but also vehicles traveling on the track such as trains, and the body of an airplane navigating the space, or the body of a ship navigating the sea.

The present invention has been accomplished in view of the conventional problem as noted above, and has its object to provide an automatic guide apparatus for traffic facilities capable of processing an enormous quantity of image data, voice data or the like at high speeds, automatically recognizing the momentarily changing circumstances with respect to traffic facilities, and automatically guiding an operating route of the road or the like.

For achieving the above-described object, an automatic guide apparatus for traffic facilities according to the present invention is characterized in comprising: an input device for obtaining the circumstances around the traffic facilities to be operated as an image, a voice or the like; a database having image data, voice data or the like in connection with the traffic facilities stored in advance; a comparison device for comparing the image data, the voice data or the like obtained by said input device with the image data, voice data or the like stored in said database; a recognition device for recognizing and specifying, where the results obtained by comparing the image data, the voice data or the like coincided, the contents of the data; and an output device for informing an operator or the like of the results recognized and specified by the recognition device in a letter of character, an image, a voice or the like.

Further, preferably, the apparatus comprises a storage device which, where the image data, the voice data or the like corresponding to the objects obtained by said input device are not present within said database, makes the image data, the voice data or the like corresponding to new objects correspond to a position on the map to newly store them in said database; and a data update device which, where the image data, the voice data or the like corresponding to the objects are different from the image data, the voice data or the like stored in said database, updates them to new image data, voice data or the like to store them in said database.

Further, preferably, the apparatus further comprises a judgment device for carrying out some judgment on the basis of the matter recognized or specified by said recognition device to inform an operator or the like of directions based on the judged results in a letter or character, an image, a voice or the like by said output device.

Further, preferably, said judgment device carries out some judgment on the basis of the matter recognized or specified by said recognition device, and directs said output device of a fixed action on the basis of the judged results to automatically actuate a brake device, a driving device or the like.

Further, in said automatic guide apparatus for traffic facilities, a device or a plurality of devices constituting it are connected with other devices through communication lines.

Further, there may be included a plane development processing device comprising: a plane image conversion device for converting perspective image data with respect to the circumstances around the traffic facilities obtained by said input device into plane image data having a perspective sense eliminated; a plane image recognition device for recognizing and specifying, on the basis of results obtained by comparing the converted plane image data with the image data stored in the database by said comparison device, the contents of said data; an image content measuring device for various space physical amounts in connection with the objects recognized and specified by said plane image recognition device.

Further, said plane image conversion device may have a function of converting image data in the whole periphery of 360 degrees about the circumstances around the traffic facilities obtained by said input device.

Further, a traffic information detection device for obtaining the circumstances around the traffic facilities as image data, measuring data or the like may be installed on the operating route of the traffic facilities so as to receive the image data, measuring data or the like obtained by the traffic information detection device.

Preferably, said traffic information detection device may have a graphic device for making a computer graphic on the basis of the image data and measuring data obtained.

Further, there may be included a position relation recognition device comprising an image obtaining portion for obtaining a picture image by the input device mounted on the traffic facilities, an image temporarily recording portion for recording the obtained picture image for a certain period, a clue-point automatic extraction portion for automatically extracting a clue point for taking a corresponding point within the image, a corresponding-point detection portion for taking out more than two images different in distance to seek for corresponding points of a plurality of clue points in the images, an input-device positional direction measuring portion for operating a position and a direction of he input device from a plurality of corresponding points detected, and an actual-measurement scale conversion portion for converting a relative distance value of a three dimensional coordinate of the input device position sought into an absolute distance value using an actual measurement value.

BRIEF DESCRIPTION OF DRAWINGS

in FIG. 8 and FIG. 9, (A) is a perspective image obtained by an input device, and (B) is a development view converted by a plane image conversion device;

BEST MODE FOR CARRYING OUT THE INVENTION

The preferred embodiments of the automatic guide apparatus for traffic facilities according to the present invention will be described in detail hereinafter with reference to the drawings.

Figure 1:
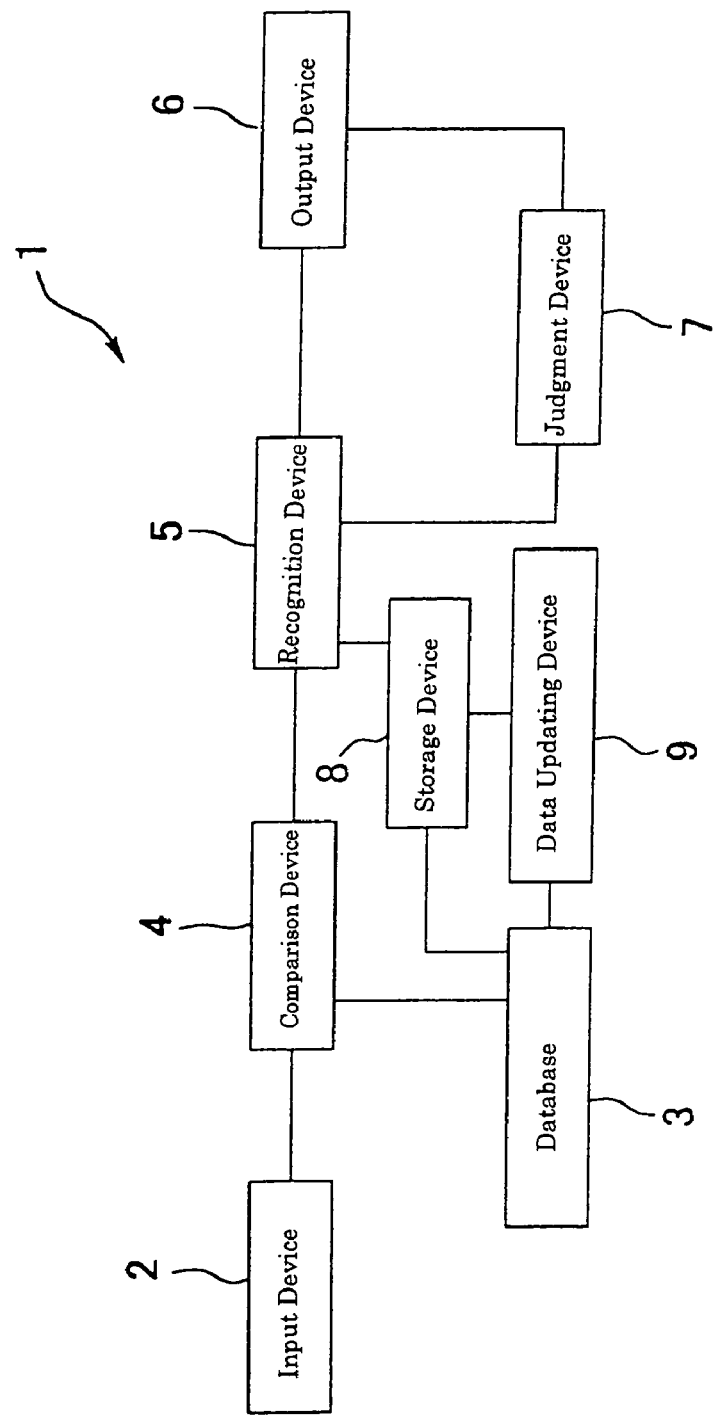
FIG. 1 is a structural view of an automatic guide apparatus for traffic facilities according to the present invention.

The automatic guide apparatus for traffic facilities 1 according to the present invention comprises, as shown in FIG. 1, an input device 2, a database 3, a comparison device 4, a recognition device 5, an output device 6, a judgment device 7, a storage device 8, and a data updating device 9.

The input device 2 is a device for, when the traffic facilities are operated, obtaining the circumstances around the traffic facilities as an image, a voice or the like. For example, an image and a voice are obtained by a video camera and a microphone, respectively.

In the database 3 are stored in advance, in case of a motor vehicle, a road mark, a road sign, a traffic guide plate or the like, and image data, voice data or the like related to a motor vehicle. In case of a train, a crossing surface, a crossing signal, a moving obstacle, a platform or the like, and image data, voice data or the like related to a train are stored. In case of an airplane, an airport shape, a runaway of an airport, an induction path, a structure such as a control tower, a moving obstacle such as a motor vehicle, and image data, voice data or the like related to an airplane or the like are stored. In case of a ship, a harbors shape, a quay of harbors, a wharf, and a fairway mark, and image data, voice data or the like related to a ship or the like are stored.

The comparison device 4 compares image data, voice data or the like obtained by the input device 2 with image data, voice data or the like stored in the database 3.

The recognition device 5 recognizes and specifies, on the basis of the results obtained by comparing the image data, the voice data or the like, contents of the data.

The output device 6 is a device for informing an operator or the like of the results recognized and specified by the recognition device 5 in a letter or a character, an image, a voice or the like.

The storage device 8 is a device for allowing, where the image data, voice data or the like corresponding to the objects obtained by the input device 2 are not present within the database, the image data, voice data or the like corresponding to the new objects correspond to a position on a map to newly store them in the database 3.

The data updating device 9 is a device for updating, where even if the object is present on a fixed position on the map, image data, voice data or the like corresponding to the object are different from the image data, voice data or the like stored in the database 3, them to new image data, voice data or the like to store them in the database 3.

The judgment device 7 is a device for carrying out, on the basis of the matter recognized or specified by the recognition device 5, some judgment, wherein the output device 6 informs an operator or the like of a direction based on the judged results in a letter or character, an image, a voice or the like.

Further, the judgment device 7 sometimes directs the output device 6 of a fixed action on the basis of judged results to automatically actuate a brake device such as a brake, and a handling device such as a handle.

In the following, a specific description will be made of an example, where the traffic facilities are a motor vehicle, in which the automatic guide apparatus 1 for traffic facilities automatically recognizes the circumstances of the own vehicle to inform a driver or an occupant of the circumstances in a letter or character, an image, a voice or the like, to guide the road, and to direct adequate action at the time of travel on the road.

Embodiment 1

Figure 2:
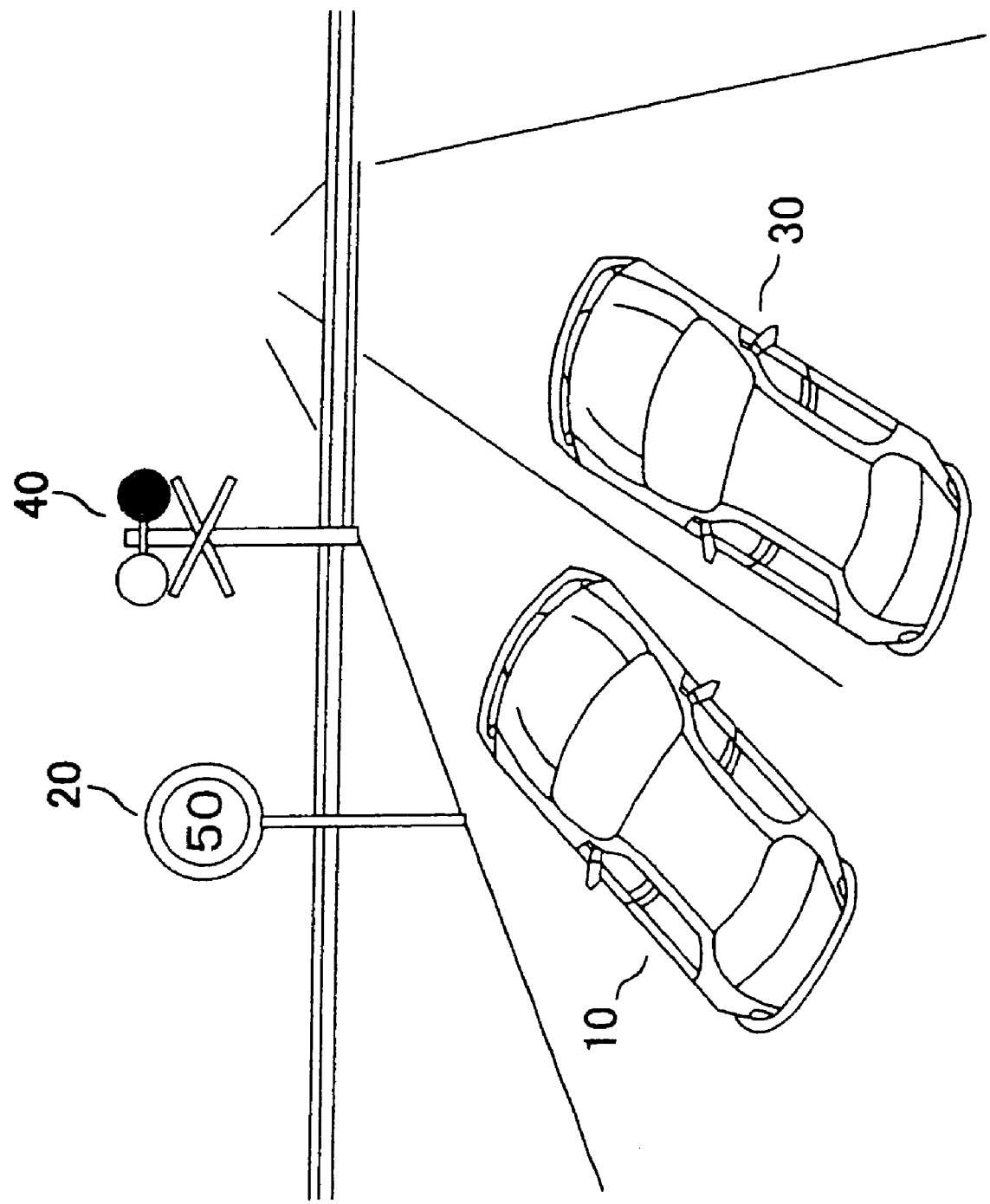
FIG. 2 is an explanatory view showing the operation of the automatic guide apparatus for traffic facilities according to the present invention; where the traffic facilities are a motor vehicle.

As shown in FIG. 2, a road mark 12 whose regulation speed is 50 km is obtained as image data by the input device 2, first, the image data is compared with the image data stored in the database 3 by the comparison device 4, and it is recognized and specified as road mark data whose regulation speed is 50 km by the recognition device 5.

Then, the fact that the regulation speed is 50 km is informed, on the basis of the recognized results to a driver or an occupant in a letter or character, an image, a voice or the like by the output device 6.

As described above, according to the automatic guide apparatus for traffic facilities 1, also where a driver or an occupant overlooks the road mark 12, it is possible to know positively that in the road being currently traveled, the regulation speed is 50 km to enable preventing a violation of the traffic regulations caused by the over-speed and also to enable preventing an occurrence of a rear-end collision or the like.

Embodiment 2

As shown in FIG. 2, where the other vehicle 13 is obtained as image data on the right side of the own vehicle 11 by the input device 2, the image data is compared with image data stored within the database by the comparison device 4, and the other vehicle 13 is recognized as a passing vehicle by the recognition device 5.

Then, the judgment device 7 carries out judgment that the other vehicle 13 does not accelerate during passing, and the output device 6 informs a driver or an occupant of a direction that not to accelerate in a letter or character, an image, a voice or the like.

As described above, according to the automatic guide apparatus for traffic facilities 1, also where a driver or an occupant does not become aware of the fact that the other vehicle 13 is present on the right side of the own vehicle 11, the driver or occupant is able to know positively that the other vehicle 13 is passing, and it is possible to prevent an occurrence of trouble such as collision with great presence of mind by the direction so as not to accelerate.

Embodiment 3

As shown in FIG. 2, where a red lamp present ahead is turned on and off by the input device 2, and a crossing signal 14 at which an alarm is ringing is obtained as image data, voice data or the like, first, they are compared with the image data, voice data or the like stored in the database 3, and the fact that the red lamp of the crossing signal 14 ahead is turned on and off and the alarm is ringing is recognized by the recognition device 5.

Then, the judgment device 7 carries out judgment that should be stopped on the basis of the recognized results, and directs the output device 6 to actuate the brake in consideration of the fact that moving into the crossing is dangerous and prohibited by the law also. Thereby, the output device 6 causes the brake to actuate, and therefore, the motor vehicle automatically stops at a safety position before the crossing.

As described above, according to the automatic guide apparatus for traffic facilities 1, also where a driver or an occupant does not become aware of the fact that the red lamp of the crossing signal 14 is turned on and out and the alarm is ringing ahead, and where even if he becomes aware, he did not take adequate action, the apparatus is able to positively inform that moving into the crossing is dangerous because the red lamp of the crossing signal 14 is turned on and out and the alarm is ringing, to direct and execute the adequate action of automatically stopping, thus enabling prevention of an occurrence of accidence or the like doing serious damage.

Next, where the traffic facilities are a train, a specific description will be made of an example wherein the automatic guide apparatus for traffic facilities 1 automatically recognizes the circumstances of the own vehicle, informs a driver or an occupant of the circumstances in a letter or character, an image, a voice or the like to guide a line or to direct adequate action when traveling on the line.

Embodiment 4

Figure 3:
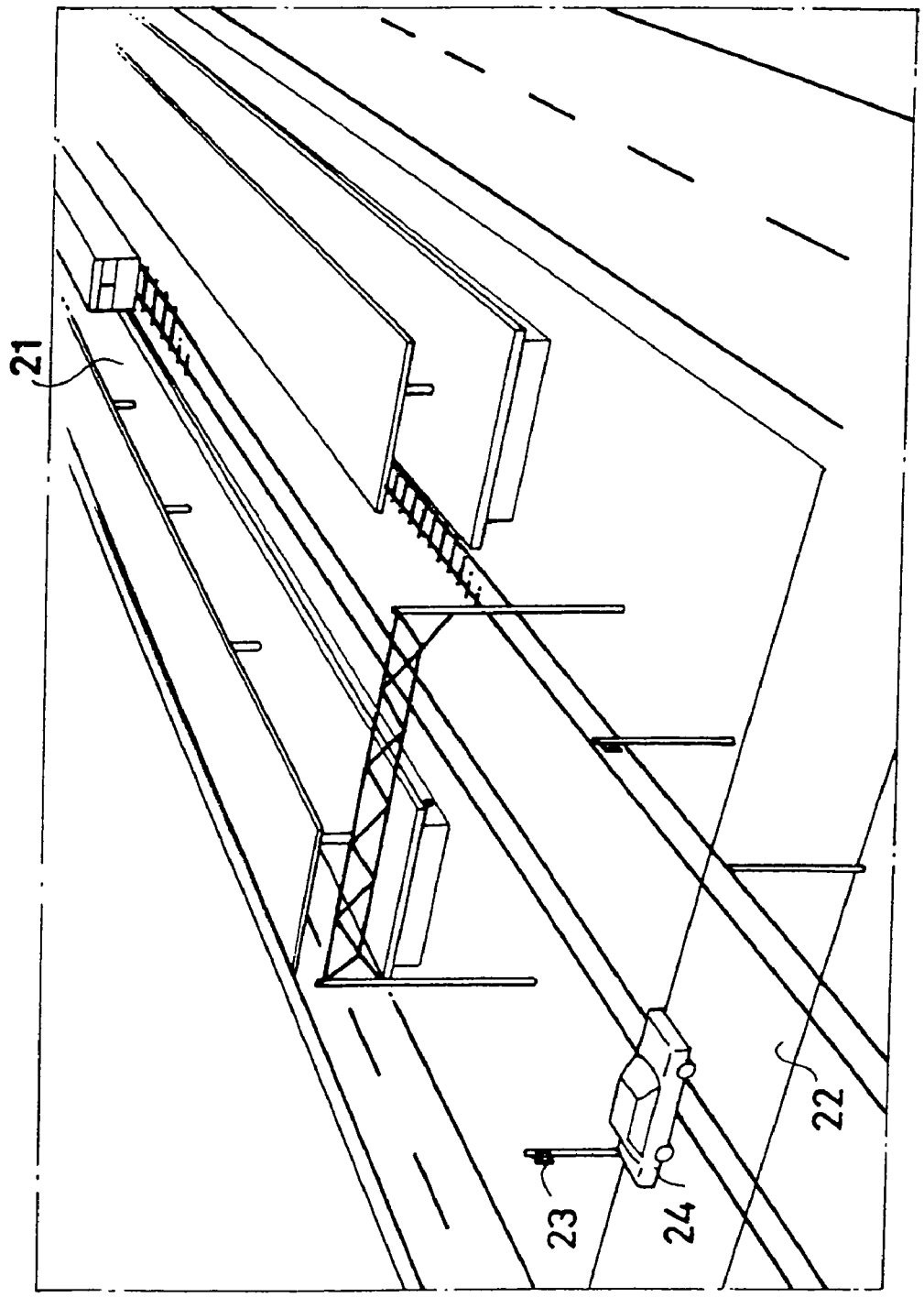
FIG. 3 is an explanatory view showing the operation of the automatic guide apparatus for traffic facilities according to the present invention; where the traffic facilities are a railroad vehicle.

As shown in FIG. 3, where a platform 21 is obtained as image data ahead of the own vehicle by the input device 2, first, it is compared with the image data stored in the database 3 by the comparison device 4, and the fact that a stop station is near is recognized by the recognition device 5.

Then, the judgment device 7 carries out, on the basis of the recognized results, judgment that since a stop station is near, deceleration is made, and the output device 6 informs a driver or an occupant of a direction of making deceleration by an image, a voice or the like.

As described above, according to the automatic guide apparatus for traffic facilities, also where a driver or an occupant does not become aware of the fact that the platform 24 is present ahead of the own vehicle, it is possible to positively know that a stop station is near, and it is possible to prevent the vehicle from passing the stop station due to an error by the direction of making deceleration.

Embodiment 5

As shown in FIG. 3, where a crossing surface 22, a crossing signal 23 and a moving obstacle 24 such as a motor vehicle are obtained as image data or voice data ahead of the own vehicle by the input device 2, first, they are compared with the image data or the voice data stored in the database 3, and that fact that a red lamp of a crossing signal 23 ahead is turned on and out, and an alarm is ringing, and the fact that a moving obstacle 24 such as a motor vehicle is present at the crossing surface 22 are recognized by the recognition device 5.

Then, the judgment device 7 carries out, on the basis of the recognized results, judgment that the vehicle has to be stopped urgently, and directs the output device 6 of immediately actuating a brake in consideration of the fact that moving into the crossing surface 22 is dangerous. Thereby, since the output device 6 immediately actuates a brake, the own vehicle automatically stops urgently at a safety position before the crossing surface 22.

As described above, according to the automatic guide apparatus for traffic facilities 1, also where a driver or an occupant does not aware of the fact that the red lamp of the crossing signal 23 is turned on and out, and the alarm is ringing, and the fact that the moving obstacle 24 such as a motor vehicle is present on the crossing surface 22, and further, where even if he becomes aware of it, adequate action has not been taken, the apparatus is able to positively inform that the red lamp of the crossing signal 23 is turned on and out and the alarm is ringing, and moving into the crossing surface 22 is dangerous, and direct adequate action of automatically rapidly stopping the vehicle, thus enabling preventing an occurrence of a crossing accident or the like doing great damage.

Next, a description will be made specifically of an example wherein where the traffic facilities are an airplane, the automatic guide apparatus for traffic facilities 1 automatically recognizes the circumstances of the own vehicle, informs an operator or an occupant of the circumstances in a letter or character, an image, a voice or the like, guides the navigating route or the interior of an airport, and directs adequate action when navigating the route and traveling the interior of the air port.

Embodiment 6

Figure 4:
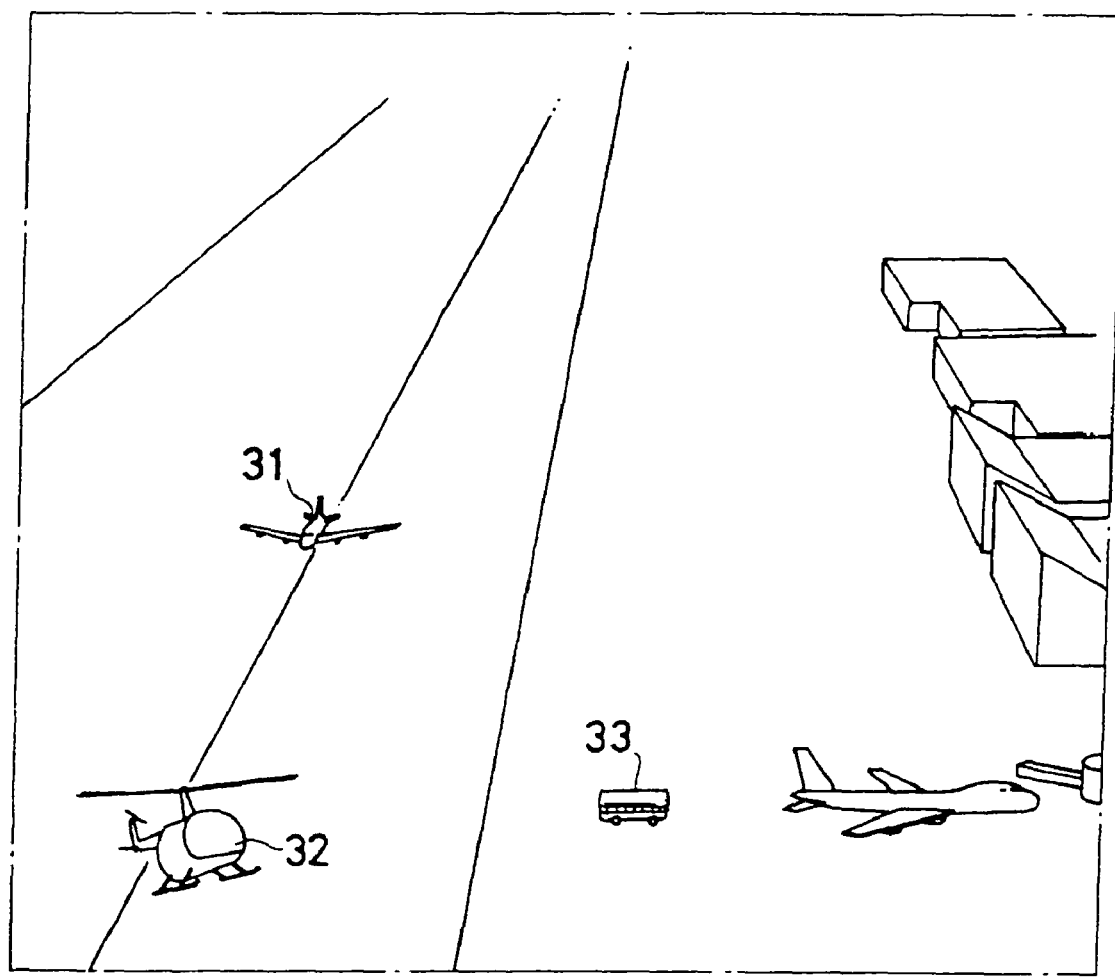
FIG. 4 is an explanatory view showing the operation of the automatic guide apparatus for traffic facilities according to the present invention; where the traffic facilities are an airplane.

As shown in FIG. 4, where moving obstacles such as the other body 32, a motor vehicle 32 or the like are obtained as image data or voice data ahead of the own body 31 by the input device 2, first, they are compared with the image data or the voice data stored within the database 3 by the comparison device 4, and the fact that the moving obstacles such as the other body 32, the motor vehicle 32 or the like are present ahead is recognized by the recognition device 5.

Then, the judgment device 7 carries out, on the basis of the recognized results, judgment that the vehicle has to be stopped urgently, and directs the output device 6 so as to immediately actuate a brake in consideration of the fact that moving ahead is dangerous. Thereby, since the output device 6 causes the brake to be immediately actuated, the own body 31 automatically stops urgently at a safety position before the moving obstacle.

As described above, according to the automatic guide apparatus for traffic facilities 1, also where an operator or an occupant does not become aware of the fact that the moving obstacles such as the other body 32, the motor vehicle 33 or the like are present ahead of the own body 31, and further, where even if becoming aware, adequate action has not been taken, the apparatus is able to positively inform that the moving obstacle is present ahead and moving ahead is dangerous, to direct and execute adequate action of automatically stopping urgently, thus enabling preventing an occurrence of accident of an airplane or the like doing great damage.

Next, a description will be made specifically of an example wherein where the traffic facilities are a ship, the automatic guide apparatus for traffic facilities 1 automatically recognizes the circumstances of the own ship, informs an operator or an occupant of the circumstances in a letter or character, an image, a voice or the like, guides the navigating route or the interior of a harbor, and directs adequate action when navigating the route and navigating the interior of the harbors.

Embodiment 7

Figure 5:
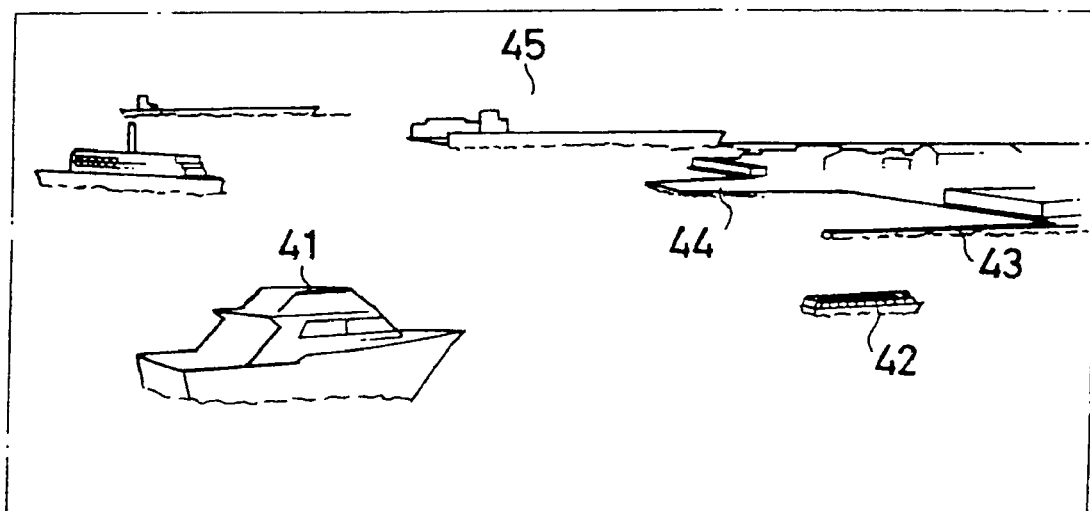
FIG. 5 is an explanatory view showing the operation of the automatic guide apparatus for traffic facilities according to the present invention; where the traffic facilities are a ship.

As shown in FIG. 5, where when a ship 41 navigates in order to reach the shore within the harbors 45, a waterway, a wharf 43, and a quay 44 are obtained as image data, first, they are compared with the image data or the voice data stored within the database 3 by the comparison device 4, and the waterway, the wharf 43, and the quay 44 are recognized by the recognition device 5.

Then, the judgment device 7 judges, on the basis of the recognized results, the navigating route from a position reaching the shore of the quay 44 and the current position of the ship 41, and the relative laws and ordinances such as the harbors law, the maritime traffic safety law or the like, and the output device 6 informs an operator or an occupant of a direction about the navigating route in a letter or character, an image, a voice or the like.

As described above, according to the automatic guide apparatus for traffic facilities 1, also where an operator or an occupant is unfamiliar with the shape of the harbors 45, the navigating route to the position reaching the ashore of the quay 44 can be known easily, thus enabling smoothly reaching the ashore to the quay 44, and enabling relieving confusion of the ship within the harbors 45.

Embodiment 8

As shown in FIG. 5, where the other ship 42, a wharf 43, a quay 44, a shoal or the like are obtained as image data and voice data ahead of the own ship 41 by the input device 2, first, they are compared with the image data or the voice data stored within the database 3 by the comparison device 4, and the fact that the other ship 42, the wharf 43, and the quay 44, shoal or the like are present is recognized by the recognition device 5.

Then, the judgment device 7 judges, on the basis of the recognized results, urgent stop or change in route has to be made, and directs the output device 6 so as to immediately take action of urgently stopping or changing the route for the ship 41 in consideration of a danger of being navigated as it is. With this, since the output device 6 causes the ship 41 to be stopped urgently or to change the route, the ship 41 is automatically stopped at a safety position or moves to a safety position.

As described above, according to the automatic guide apparatus for traffic facilities 1, also where an operator or an occupant does not become aware of the fact that the other ship 42, the wharf 43, and the quay 44, shoal or the like are present ahead, and where even if becoming aware of it, adequate action has not been taken, the apparatus is able to positively inform that the other ship 42, the wharf 43, and the quay 44, shoal or the like are present, and navigation as it is dangerous, to direct and execute adequate action of automatically stopping urgently and changing the route, enabling preventing an occurrence of accident of a ship or the like doing great damage.

Alternatively, in the automatic guide apparatus for traffic facilities 1, any one or a plurality of devices out of the input device 2, the database 3, the comparison device 4, the recognition device 5, the output device 6, the judgment device 7, the storage device 8 and the data updating device 9 which constitute the apparatus 1 may connected to the other devices constituting the automatic guide apparatus for traffic facilities 1 through communication lines.

According to the structure as described above, it becomes possible to remote-control the traffic facilities in a central control center.

As described above, according to the automatic guide apparatus for traffic facilities, an enormous quantity of image data, voice data or the like can be processed at high speeds, and it is possible to automatically recognize the circumstances around the traffic facilities which momentarily change and to automatically guide the operating route.

Further, in the automatic guide apparatus for traffic facilities 1 according to the present invention, there can be added a plane development processing device 51.

Figure 6:
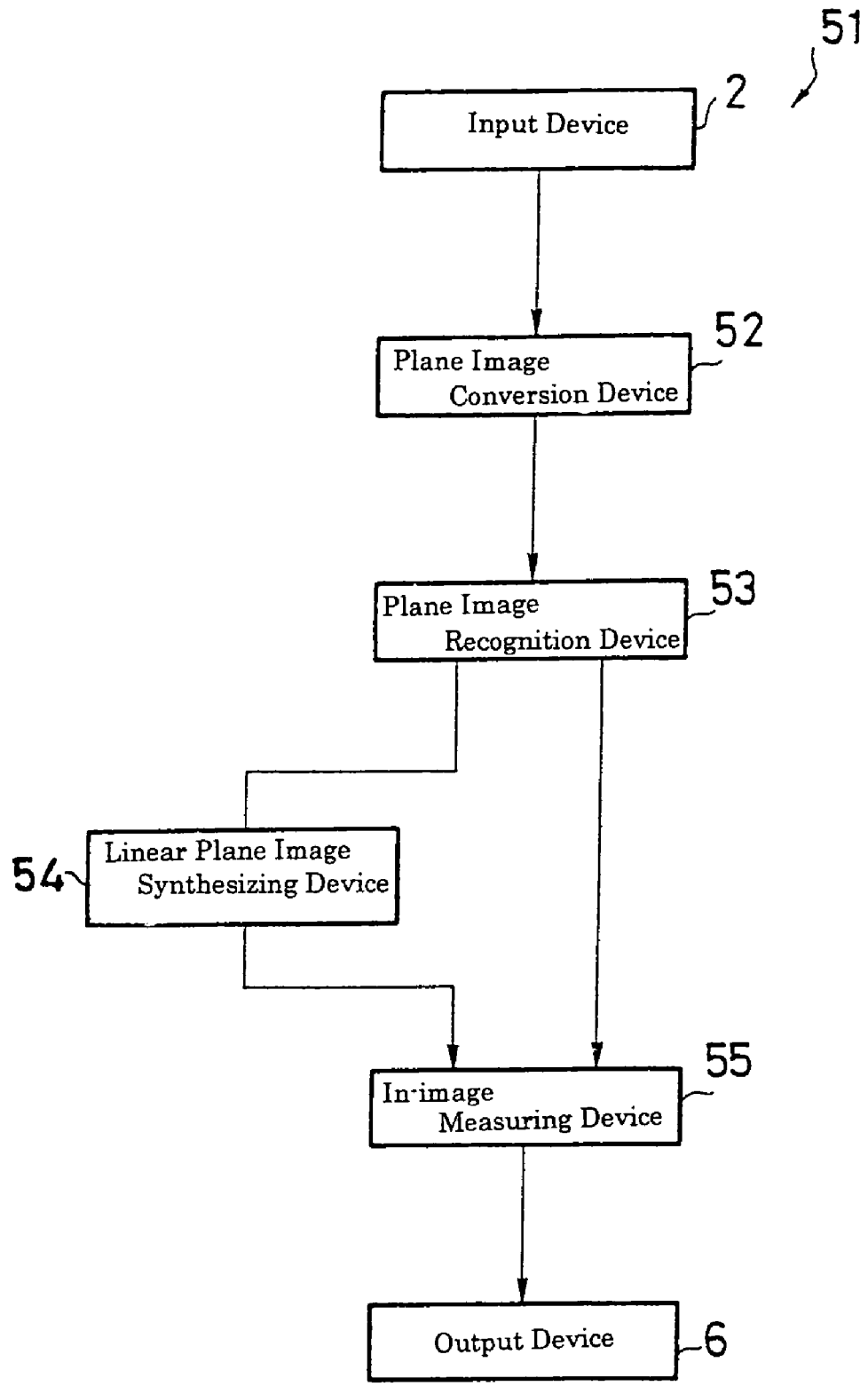
FIG. 6 is a structural view of a plane development processing apparatus to be mounted on the automatic guide apparatus for traffic facilities according to the present invention.

The plane development processing device 51 is a device in which a perspective image obtained by the input device 2 about the circumferences around the operating traffic facilities is subjected to plane development thereby to be converted into a plane image from which perspective sense is eliminated, on the basis of which measuring process for a distance, an area or the like is executed, and comprises, as shown in FIG. 6, a plane image conversion device 52, a plane image recognition device 53, a plane image coupling device 54, and an image content measuring device 55.

When the traffic facilities are operated, the circumstances around the traffic facilities are obtained as a perspective image by the input device 2.

The plane image conversion device 5 is a device for subjecting the obtained perspective image to plane development to be thereby converted into a plane image.

Figure 7:
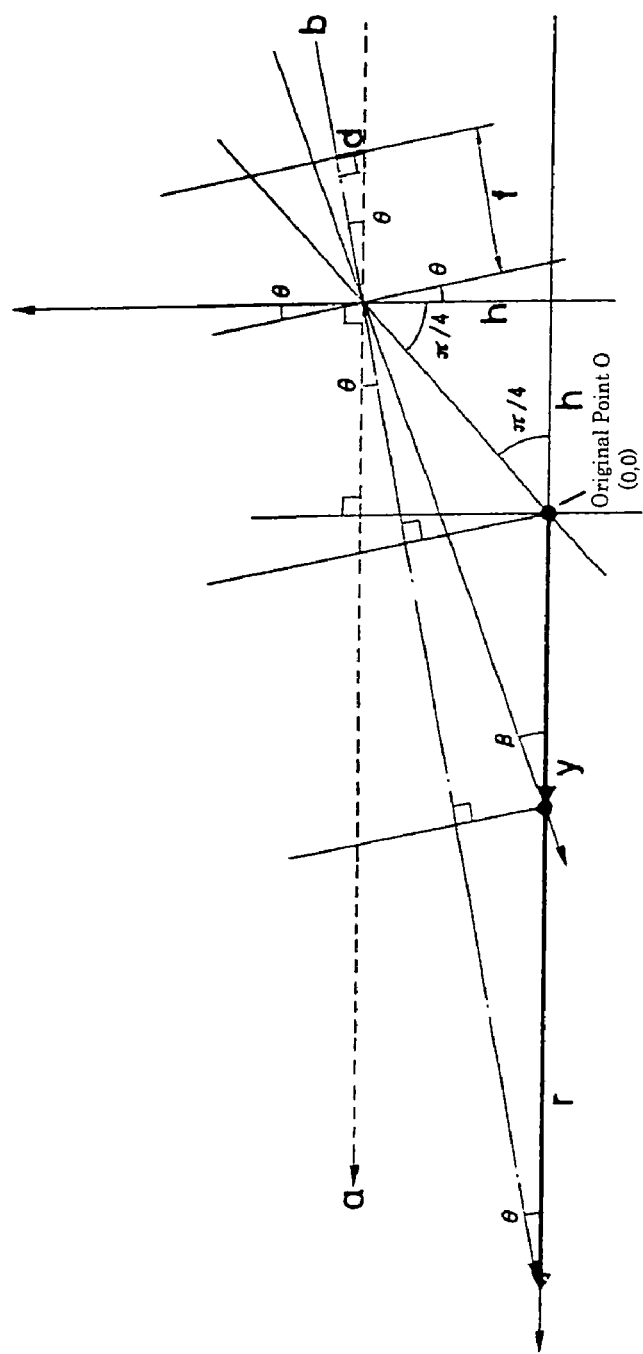
FIG. 7 is a view, in a system in which a perspective image obtained by a video camera is subjected to plane development and converted into a plane image from which a perspective sense is eliminated, showing a variable to be used.

The perspective image obtained by a video camera as the input device 2 is subjected to plane development by the following Equations (1) and (2) using variables shown in FIG. 7, for example.

$$y = v \cdot 2^{1/2} \cdot h \cdot \cos(\pi/4 - \theta) \cdot \cos(\beta - \theta)/(f \sin \beta) \quad (1)$$

$$x = u \cdot h \cdot \cos(\beta - \theta)/(f \sin \beta) \quad (2)$$

Wherein θ is an angle formed between an optical axis of a camera and a plane of the road surface or the like; f is a focal distance of the camera; h is a height of the camera; β is an angle formed between a line segment for joining a point in a distance from a portion directly below the camera to h+y with the camera, and a plane of the road surface or the like; v is a coordinate in a longitudinal direction from an original point on the projection surface of the camera; u is a coordinate in a lateral direction from an original point on the projection surface of the camera; y is a longitudinal coordinate whose original point is a point moved by h from a portion directly below the camera in the plane such as the road surface; and x is a lateral coordinate in the plane such as the road surface.

The plane image recognition device 53 is a device for recognizing and specifying, on the basis of the results obtained by comparing the converted plane image data with the image data stored in the database 3, the content of the data.

The plane image coupling device 54 is a device for suitably coupling the converted plane image data to produce plane image data of a large screen.

The image convent measuring device 55 is a device for measuring various space physical amounts in connection with objects recognized and specified by the plane image recognition device 53. The space physical amounts include a position, a distance, an area, a height, a depth, a volume, a speed, an acceleration or the like.

Next, a specific description will be made of an example wherein where the traffic facilities are a vehicle traveling on the road such as a motor vehicle, a fixed space physical amount is measured and processed by the plane development processing device 51.

Embodiment 9

As shown in FIG. 8(A), where a traveling lane 56 extending ahead of the own vehicle is obtained as perspective image data by the input device 2, first, the data is converted into plane image data as viewed from the vertical top with a perspective sense eliminated, as shown in FIG. 8(B), by the plane image conversion device 52. Here, the contents of the converted plane image data are recognized and specified by the plane image recognition device 53, to recognize and specify the fact that the traveling lane 56 is present within the plane image.

Then, various space physical amounts of a lane width, a parallelism of a lane or the like are measured, in connection with the traveling lane 56 as an object, as shown in FIG. 8(B), by the image content measuring device 55. Further, if perspective image data is obtained at real time by the input device 2, a moving distance per time is measured to thereby enable measuring an advancing speed of the own vehicle.

Next, a specific description will be made of an example wherein where the traffic facilities are a vehicle traveling on the track such as a train, a fixed space physical amount is measured and processed by the plane development processing device 51.

Embodiment 10

Where a track 57 extending ahead of the own vehicle is obtained as perspective image data by the input device 2, as shown in FIG. 9(A), first, the data is converted into plane image data as viewed from the vertical top with a perspective sense eliminated, as shown in FIG. 9(B), by the plane image conversion device 52. Here, the contents of the converted plane image data are recognized and specified by the plane image recognition device 53, to recognize and specify the fact that the track 57 is present within the plane image.

Figure 10:
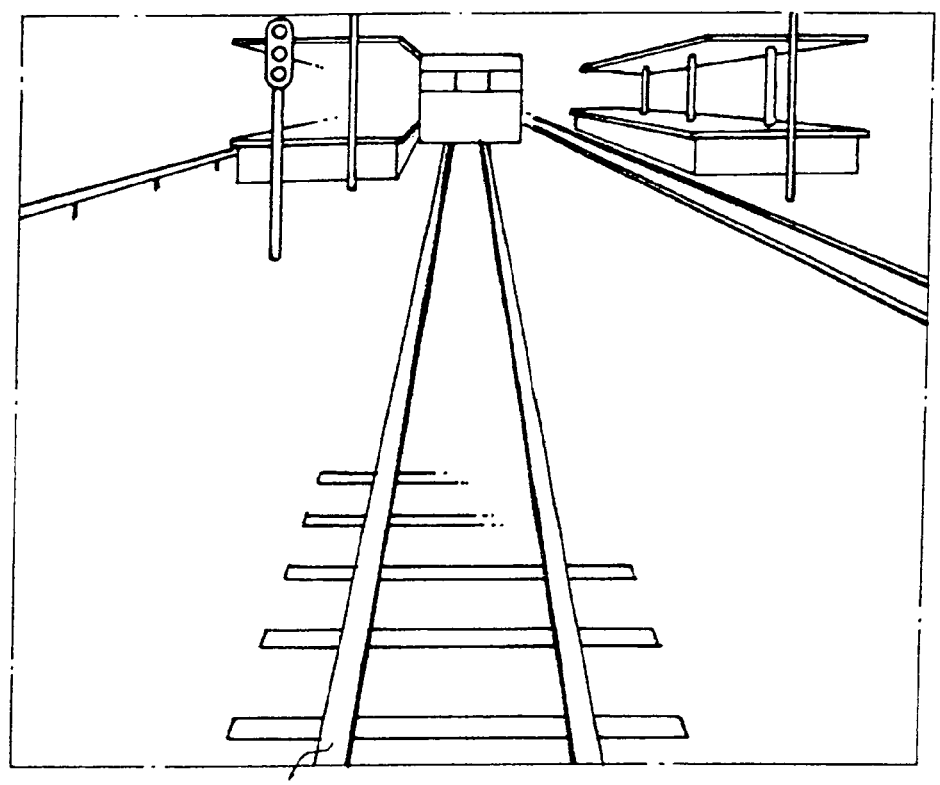
FIG. 10 is an explanatory view showing a space physical amount to be measured by an image content measuring device.

Then, various space physical amounts of a rail width, a rail parallelism or the like are measured, in connection with the track 57 as an object, as shown in FIG. 10, by the image content measuring device 55. Further, if perspective image data is obtained at real time by the input device 2, a moving distance per time is measured to thereby enable measuring an advancing speed of the own vehicle.

As described above, according to the plane development processing device 51, which is annexed to the automatic guide apparatus for traffic facilities 1, various space physical amounts in connection with the circumstances around the traffic facilities can be obtained when operating the traffic facilities.

Further, it is also possible to issue more adequate notice and direction on the basis of the obtained space physical amounts in the automatic guide apparatus for traffic facilities 1.

The plane development processing device 51 may have not only a function of converting a perspective image into a plane image, but also a function of converting a 360-degree whole peripheral image (spherical image) into a plane image.

The 360-degree whole peripheral image is an image which grasps the whole periphery of the operating traffic facilities, that is, all directions including before and behind, left and right, and top and bottom, which image can be obtained by methods, for example, ① images photographed by many cameras are synthesized, ② a curved mirror is installed on the front surface of a camera, and an image projected on the curved surface is photographed, ③ a single camera is rotated, and images photographed at respective positions are synthesized, and ④ a fish-eye lens is mounted on the camera, and an image photographed in a wide range is processed.

Figure 11:
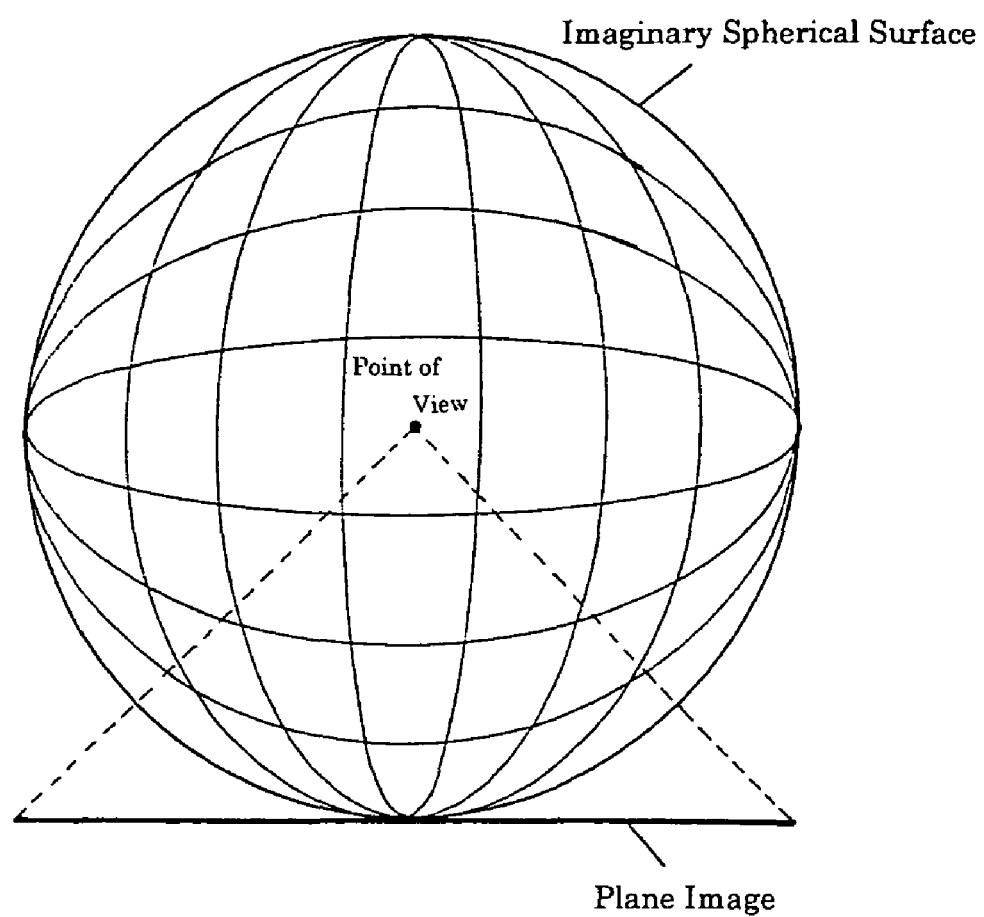
FIG. 11 is an explanatory view showing the concept in which a 360-degree whole periphery image is subjected to plane development and converted into a plane image.
Figure 12:
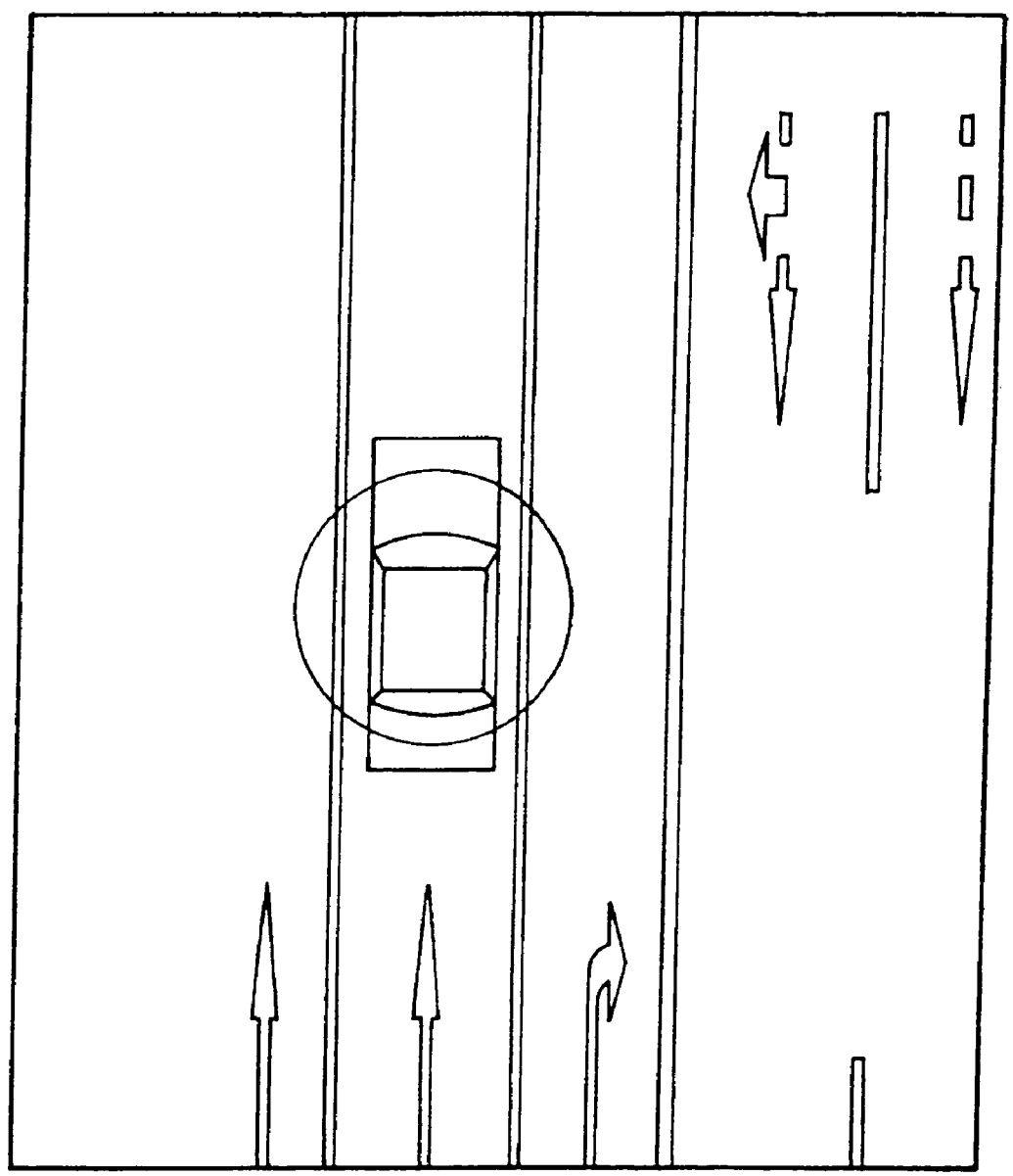
FIG. 12 is an example of a plane image converted from the 360-degree whole periphery image.

If the 360-degree whole peripheral image is regarded as an image attached onto an imaginary spherical surface, as shown in FIG. 11, the converted plane image can be grasped as an image projected on the plane as viewed from a desired visual point.

Where the circumstances around a motor vehicle traveling on the road surface are obtained as the 360-degree whole peripheral image by the methods as described above, an example is shown in FIG. 12, in which the image is converted into a plane image with the top of a motor vehicle as a visual point.

While in the foregoing, a description has been made of examples in which the traffic facilities are a vehicle traveling on the road surface such as a motor vehicle, and a vehicle traveling on the track such as a train, it is noted that the same is also applied to an airplane, a ship or the like.

Further, alternatively, a traffic information detection device 61 is separately installed on the operating route of the traffic facilities so that image data, measured data or the like obtained by the traffic information detection device 61 may be transmitted to the automatic guide apparatus for traffic facilities 1.

The traffic information detection device 61 comprises, in the automatic guide apparatus for traffic facilities 1, the input device 2, the database 3, the comparison device 4, the recognition device 5, the storage device 8, the data updating device 9, the plane development processing device 51, and a graphical device 62.

The graphical device 62 is a device for forming computer graphic (CC) on the basis of image data and measured data obtained from the input device 2.

Next, a specific description will be made of an example wherein where the traffic facilities are a motor vehicle, image data, measured data or the like obtained by the traffic information detection device 61 installed on the operating route are transmitted to the automatic guide apparatus for traffic facilities 1.

Embodiment 11

Figure 13:
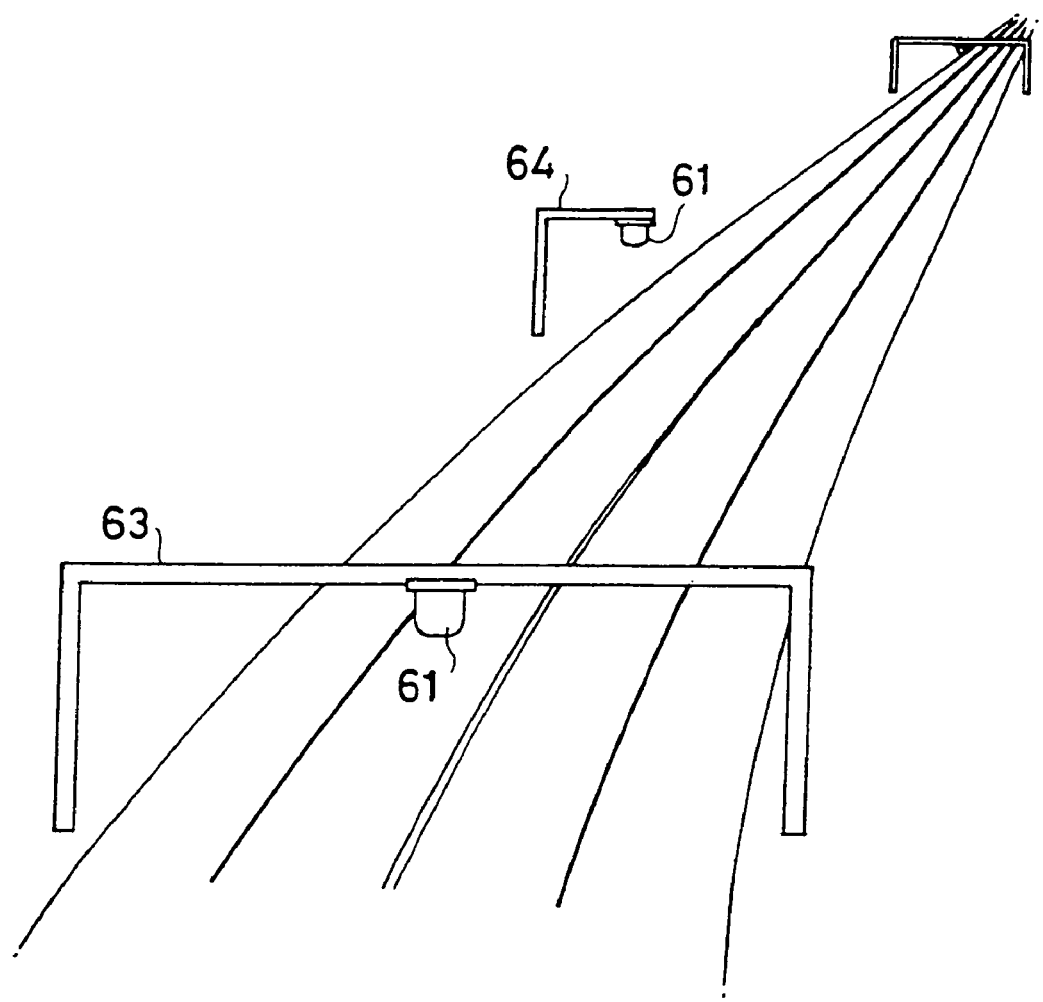
FIG. 13 is an explanatory view showing an installation example of a traffic information detecting device in the road.
Figure 14:
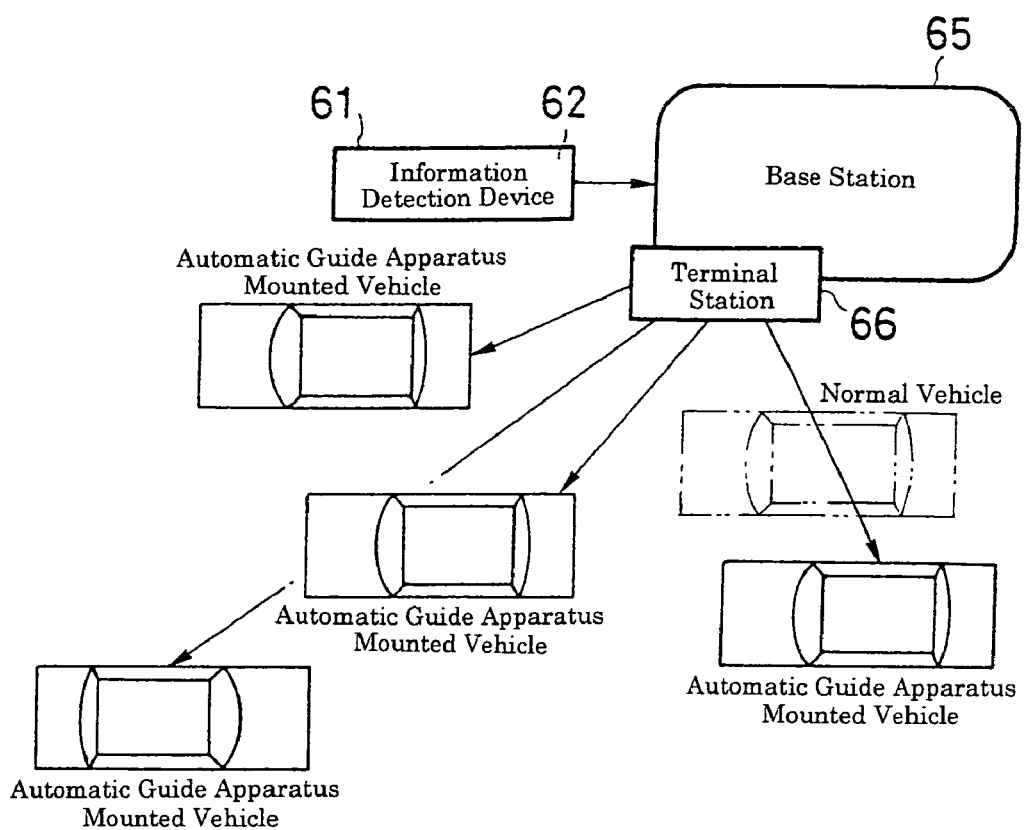
FIG. 14 is an explanatory view showing a transmission example from a traffic information detecting device to an automatic guide apparatus for traffic facilities.

In case of a motor vehicle, the traffic information detection device 61 is installed on a gate 63, an illumination lamp 64 or the like provided on the road as shown in FIG. 13, for example. And, as shown in FIG. 14, image data, measured data or the like obtained by the traffic information detection device 61 are, first, transmitted to a base station 65 installed for the purpose of concentrating and controlling data, then delivered to a plurality of terminal stations 66 installed on suitable locations, and transmitted from the terminal stations 66 to the respective vehicles on which the automatic guide apparatus for traffic facilities 1 is mounted.

The image data, measured data or the like to be delivered from the traffic information detection device 61 to the respective vehicles on which the automatic guide apparatus for traffic facilities 1 is mounted through the base station 65 and the terminal stations 66 are formed into computer graphic images (CG), which are transmitted together with figures, numerical values or the like. Therefore, in the automatic guide apparatuses for traffic facilities 1 of the respective vehicles, they are displayed in figure, numerical value, letter or the like, as shown in FIG. 15, which is very convenient.

In an output screen formed into computer graphic, the coordinate of the own vehicle is fixed to a suitable position, and the circumferences around the traveling own vehicle, that is, positions or displays of the road mark, rod sign, traffic guide plate, other vehicles or the like are to be changed momentarily when passing through the traffic information detection device 61.

It is noted that images displayed on the output screens may be, not limiting to the plane computer graphic image, a three-dimensional computer graphic image (3 DCG) or may be an image synthesized with an actual image subjected to plane development.

Figure 15:
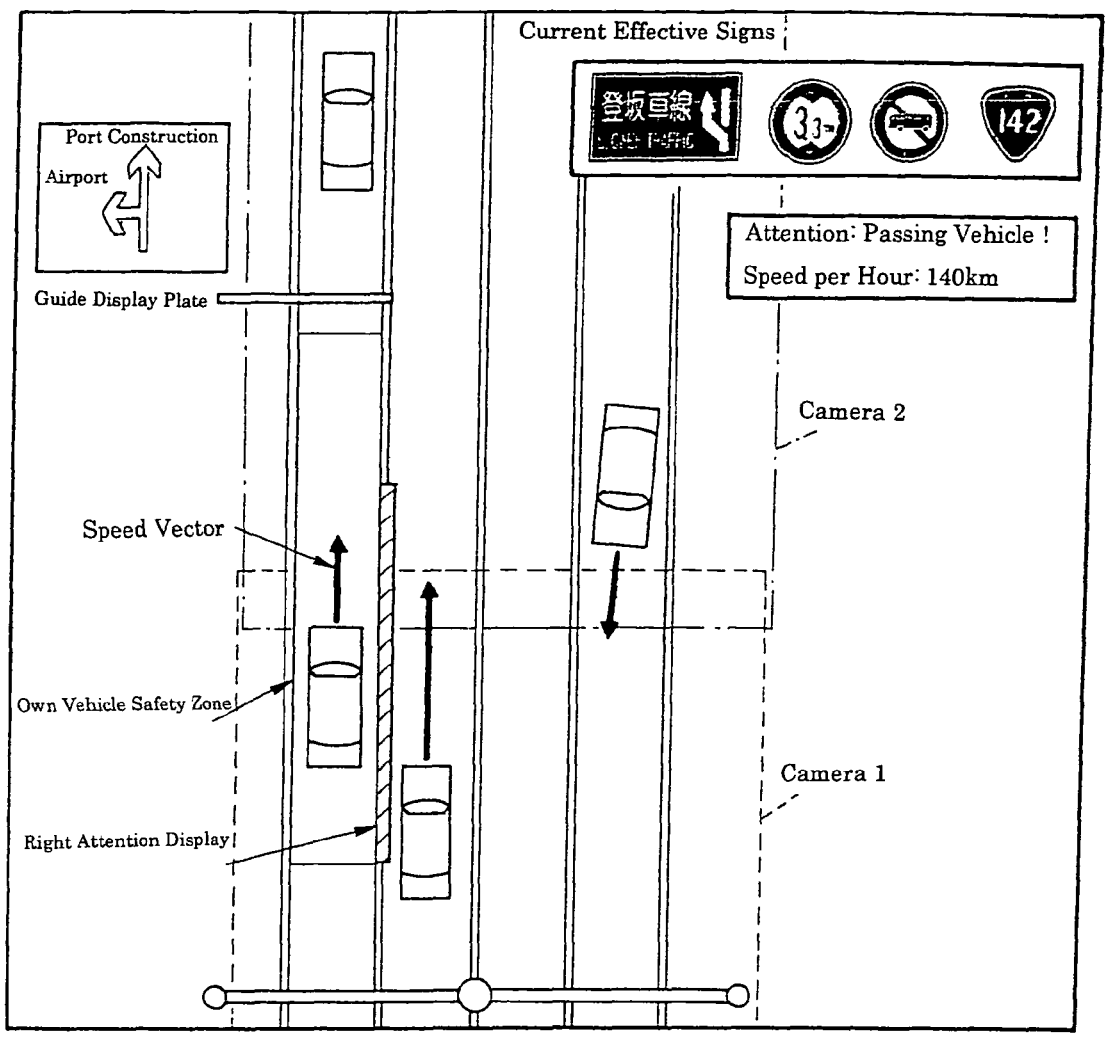
FIG. 15 is an example of an output screen to be displayed as a computer graphic image where a vehicle travel on the road.

An output screen shown in FIG. 15 shows a case where other vehicles which infringe or possibly infringe a preset safety zone of the own vehicle are present, and this informs a driver or an occupant in a letter or character, a voice or the like such as "Passing vehicle is present Speed per hour: 140 km".

Embodiment 12

Figure 16:
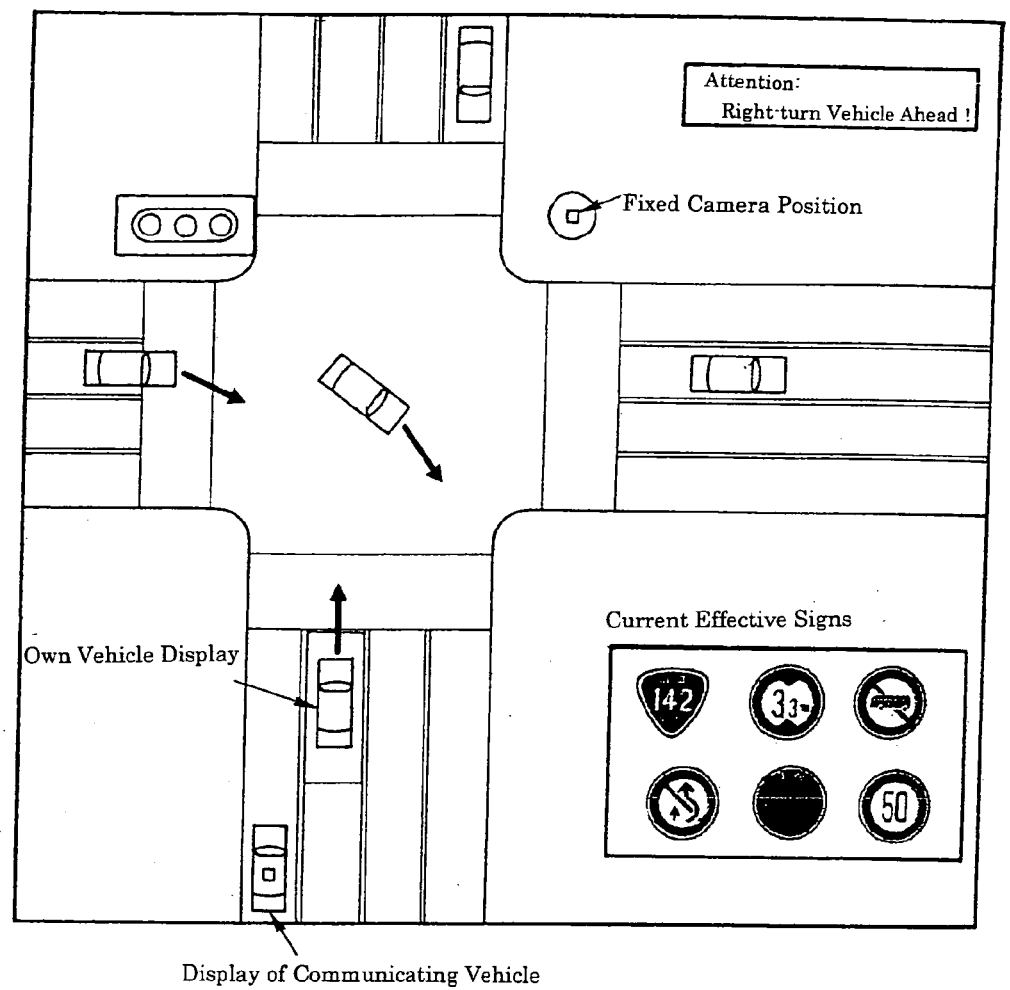
FIG. 16 is an example of an output image to be displayed as a graphic image, where the vehicle moves into a crossing.
Figure 17:
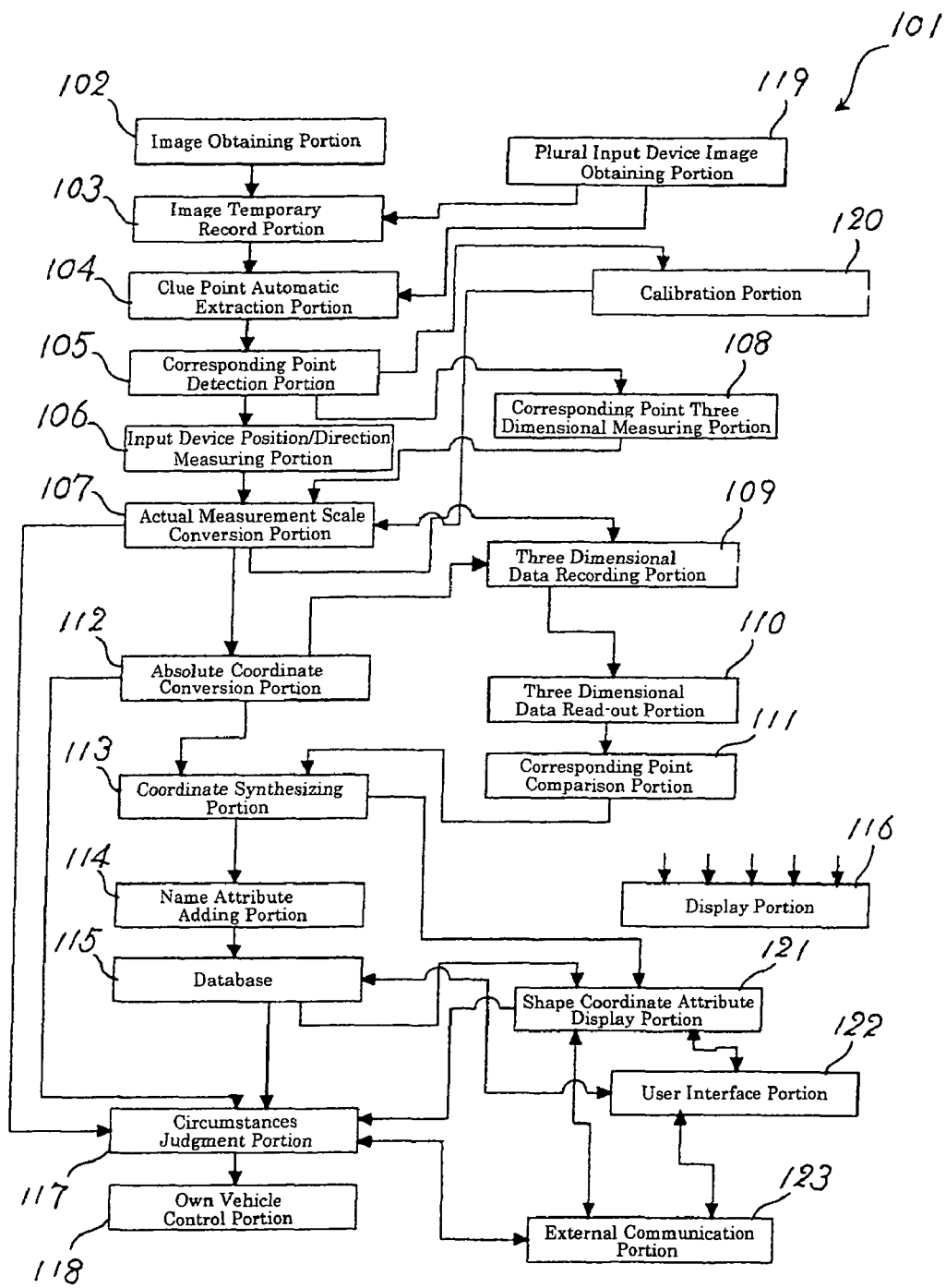
FIG. 17 is a structural view of a position relation recognition device mounted on the automatic guide apparatus for traffic facilities according to the present invention.

The recognition of traffic information by transmission from the traffic information detection device 61 to the automatic guide apparatus for traffic facilities 1 makes it possible to easily grasp, particularly where in a crossing or the like, left and right roads are the dead point from the own vehicle, as shown in FIG. 16, the traffic circumstances of the left and right roads, which is very useful in terms of the traffic safety measures.

An output screen shown in FIG. 16 shows a case where other vehicles are present at a position at which the left and right roads are the dead angle from the own vehicle, and this informs a driver or an occupant in a letter or character, a voice or the like such as "Right-turn vehicle is present ahead".

While in the foregoing, a description has been made taking an example in which the traffic facilities are a motor vehicle traveling on the road surface, it is to be noted that this can be likewise applied also to a vehicle traveling on the track such as a train, an airplane, a ship or the like.

Further, if in the automatic guide apparatus for traffic facilities 1, a device capable of accurately recognizing a positional relation between the operating traffic facilities and the circumference is added, it is possible automatically guide the traffic facilities more effectively.

In the following, a description will be made of a positional relation recognition device 101 capable of accurately recognizing a positional relation between the operating traffic facilities and the circumference, where traffic facilities are a vehicle traveling on the road surface such as a motor vehicle.

As the apparatus for recognizing a positional relation of an operating vehicle to guide the vehicle, there has been already developed an apparatus for detecting a while line attached to the road from a picture obtained by a camera mounted, and guide the vehicle so as not to protrude from the while line.

In the above apparatus, the own vehicle is positioned only in the relation with the white line, limiting to a special object called a white line. Therefore, in the road having a white line not attached, a position recognition function and an automatic guiding function stop, and if a white line is formed to be curved, an erroneous operation possibly occurs. Further, where advancing along the white line like a crossing is not always in line with the purpose, a position recognition function and an automatic guiding function have no meaning at all. Further, there is a fear that those other than a white line are erroneously recognized as a white line, and even if traveling along the white line, where an obstacle is present, it is not possible to avoid it.

The positional relation recognition apparatus 101 according to the present invention is an apparatus which recognizes, making use of not only the white line attached to the road but also all objects in the picture obtained by a camera, a three dimensional position of the own vehicle, and which is able to three-dimensionally position the own vehicle in the peripheral circumstances.

That is, in the positional relation recognition apparatus 101, not only the white line attached to the road but also all objects present in the picture serve as a clue for three dimensional measurement. Further, not the objects themselves, but a part that is easily extracted by the image process in the objects serves as a clue. Further, a plurality of those which tend to be clue for the three dimensional measurement in the objects are extracted. Furthermore, the objects are not extracted at the outset, but there is characterized in that objects that could be extracted serve as a clue.

In the respective images of a continuous image in which the clue portions in the picture are produced by the advancement of the vehicle, an image processing technique such as a matching method is applied for automatic tracking. The tracking is sometimes succeeded, or the tracing is sometimes failed. However, only the clue portion that succeeded the tracking may be employed as an object of three dimensional measurement.

On the basis of a plurality of clue portions that succeeded the tracking during the vehicle is moving for suitable distance, a fixed calculation is carried out to thereby detect and recognize the three dimensional position and direction of the own vehicle.

Further, a plurality of cameras are mounted so that fields of view are not superposed, a corresponding point is detected among the superposed fields of view and three dimensional measurement is carried out. And, a three dimensional position and a direction of the own vehicle are positioned in the three dimensional coordinate constituted by portions to be peripheral clues, or in the peripheral three dimensional image obtained by other methods.

According to the positional relation recognition apparatus 101 in the present invention, ① Since a great parallax can be obtained, measuring accuracy with respect to the distant object is enhanced.

② Accumulation of errors can be lessened.

③ Since a position of a camera can be measured by calculation, the structure of apparatus is simple, and setting of a camera is extremely facilitated.

④ Since the three dimensional measurement is enabled from picture data photographed by a camera, the past picture materials can be used.

⑤ From data with respect to the point to be a feature obtained in the past by traveling, with the feature point as a clue, a position of the own vehicle can be obtained in a three-dimensional manner by calculation.

⑥ A vehicle position and direction in an area not projected in the picture can be obtained by calculation.

As described above, according to the positional relation recognition apparatus 101, various functions that never be done by the position detection of the own vehicle merely by the white line can be displayed.

And, the peripheral traffic circumstances are judged, which is transmitted to the operator, or the vehicle is controlled directly on the basis thereof, and the higher-level traffic guidance can be realized, thus enabling contributing to the traffic safety effectively.

The positional relation recognition apparatus 101 according to the present invention is an apparatus which detects, on the basis of picture information of the road surface, the peripheral body or the like photographed by an output device such as a video camera mounted on the vehicle, a three dimensional position of the road surface, the peripheral body or the like and the own vehicle so as to be able to recognize a positional relation with the road surface. The apparatus is characterized in comprising: an image obtaining portion 102 for obtaining an image by an input device mounted on the vehicle; an image temporarily recording portion 103 for recording the obtained image for a certain period; a clue point automatic extrusion portion 104 for automatically extracting a clue point for taking a corresponding point within the image; a corresponding point detection portion 105 for defecting a corresponding point of a plurality of clue points in the respective images; an input device position and direction measuring portion 106 for calculating a position and direction of the input device; and an actually measured scale conversion portion 107 for converting a relative distance in a three dimensional coordinate at a position of the calculated input device into an absolute distance using the actually measured value.

According to the mage obtaining portion 102 and the image temporarily recording portion 103, a picture from the input device such as a video camera mounted on the own vehicle, and by arranging them on the time axis, an image which changes in time as the vehicle advances is obtained. That is, in connection with a static object, there is obtained a result similar to that photographed by arranging a plurality of cameras on the road on which the vehicle advances. By doing so, even a single camera is used, a plurality of parallaxes can be obtained by moving the cameras.

Next, by the clue point automatic extracting portion 104, a contour of an image is extracted in order to make a feature point in an image a clue point, or divided into color areas to automatically extract the feature portion in the image.

The clue point termed herein means, in order to obtain a corresponding point between images photographed at points different n position, a feature point within the image to be the corresponding point. The clue point is sometimes an object itself, but is often a portion of the object. Further, since the feature point is not a feature point for a human being but may be a feature point for a computer which processes an image, the image processing is extremely advantageous.

It is not necessary to specify a clue point to be detected at the outset, but an object that could be detected easily in the actual site at that time or a portion thereof can be employed as a clue point. Further, with respect to a plurality of clue points detected, it is not necessary to specify a clue point to be tracked at the outset, but only the clue point that could be tracked can be employed as a clue point for a calculation object for a three dimensional measurement. By these features, the recognition by the positional relation recognition apparatus 101 can be realized.

Next, by the corresponding point detection portion 105 and the input device position and direction measuring portion 106, a plurality of corresponding points are detected by an image matching method or the like, and an input device position and direction of a camera or the like is obtained by calculation on the basis of coordinates of the respective corresponding points.

Here, the position and direction of the input device are continuously obtained, whereby the speed of the input device, that is, the vehicle speed, the vehicle acceleration, and the vehicle advancing direction can be obtained.

Some corresponding points are hidden as a vehicle moves, but if many clue points are sufficiently selected, and several clue points are remained finally, this will suffice to enable calculation satisfactorily.

Further, an object secured to a static coordinate system has to be selected to a clue point, but sufficiently many clue points are selected, and statistics processing is applied thereto to delete those indicative of abnormal values and leave only effective clue points, whereby the three dimensional measurement becomes enabled.

The data of a camera position obtained by calculation is a relative distance, and for converting it to an absolute distance, one or more known distances are necessary in connection with the corresponding point coordinate or the vehicle position coordinate which is an object to be measured. However, as the value which is not changed in distance as the vehicle travels, for example, a height where a cameral is installed or a distance known at the outset within the image may be used and calibrated. Further, where a plurality of cameras are installed, the distance between the cameras can be employed as a known distance. Furthermore, if the known actually measured value is present in the object within the image, it can be converted to an absolute distance by the actually measured scale conversion portion 107.

In the way as described above, the camera position and direction can be measured in a three-dimensional manner.

To the above-described positional relation recognition device 101 may be added a corresponding point three dimensional measuring portion 108 for three dimensional measuring a plurality of clue points from corresponding points within the respective images of a plurality of clue points to obtain a relation between them and a camera position as a three dimensional coordinate.

According to the corresponding point three dimensional measuring portion 108, three dimensional data of a clue point is also obtained simultaneously during the calculation for obtaining the three dimensional data of the position and direction of a camera. Thereby, it is possible to arrange a camera position in a three dimensional position of a plurality of clue points, a three dimensional disposition, and a two dimensional distribution. That is, the position and direction of a vehicle can be arranged in a three dimensional manner in the same three dimensional coordinate system as the three dimensional distribution of a plurality of clue points in the periphery.

Whereby, a position of the own vehicle, correctly, a camera mounted on the own vehicle can be positioned in a three dimensional manner in a static object in a static coordinate system in the periphery, in other words, in a three dimensional coordinate including peripheral buildings, poles, roads or the like.

Further, there can be added a three dimensional data recording portion 109 for recording a three dimensional coordinate of a corresponding point obtained by the corresponding point three dimensional measuring portion 108.

The three dimensional data of the clue point obtained by the calculation is recorded and left, whereby when traveling around later, the clue point having obtained three dimensional coordinate already may be referred to as an index of the calculation of the position and direction of the vehicle.

Actually, a vehicle having an exclusive-use device mounted in advance is traveled, and three dimensional data of more accurate clue points are collected, whereby many vehicles may use them later.

Further, there can be added a three dimensional data read-out portion 110 for reading out three dimensional data of clue points accumulated in the three dimensional data recording portion 109 from the three dimensional data recording portion 109 when traveling in the periphery thereafter; and a corresponding point comparison portion 111 for comparing those data with the three dimensional data obtained when traveling thereafter to obtain a coincided point, thus enhancing calculation accuracy of a vehicle position.

The three dimensional data are read out by the three dimensional data read-out portion 110 from the three dimensional data recording portion 109, and if there is a change in a coordinate of a previous clue point every time of later travel, its coordinate may be updated and recorded again as new data.

As the travel near the same place is repeated, the data of the three dimensional data recording portion 109 are updated and added newly, whereby the clue points are increased, or the position accuracy is enhanced, and the calculation accuracy of the position and direction of the vehicle is also enhanced.

The three dimensional data of high accuracy are produced by the exclusive-use device in advance, which are used later by other vehicles, whereby the position accuracy of the clue point is enhanced extremely. Further, if three dimensional map data having a clue point expanded to a pixel unit are produced in advance by the exclusive-use device, a three dimensional space around the travel path is constituted, within which position and direction of a vehicle can be arranged.

Further, there can be added an absolute coordinate conversion portion 112 for selecting an object whose absolute coordinate is known at a corresponding point, and imparting an absolute coordinate to three dimensional data obtained by the input device direction measuring portion 106 and the corresponding point measuring portion 108; and a coordinate unifying portion 113 for unifying a three dimensional coordinate of a clue point present in an area relative to an absolute coordinate system.

Acceding to the absolute coordinate conversion portion 112, for example, an absolute coordinate of a camera position is obtained by GPS, or three dimensional data obtained as a relative distance can be converted to an absolute coordinate with an object whose latitude and longitude are known as a clue.

Further, according to the coordinate unifying portion 113, coordinates of some clue points can be unified in a common absolute coordinate system and displayed, and the three dimensional data is to obtain the absolute coordinate immediately.

If the clue point obtains the absolute coordinate, thereafter also, or even other vehicles can use it as three dimensional data whose clue point is common.

Site data coincided with three dimensional data having clue points collected is to have obtained an absolute coordinate because of being coincided with a position, disposition and distribution of clue points. Then, a camera position, that is, an absolute coordinate of a vehicle can be obtained immediately.

Further, a three-dimensional coordinate by way of a clue point is dropped into a map of the whole area whereby a map and a clue point are connected to create new data, and many vehicles may obtain a map for recording data of position and direction of the own vehicle as common data.

Further, there can be added a name attribute adding portion 114 for corresponding a name and attribute of a clue point to position data of a clue point to record and store them, and adding a name and attribute of an object to which a clue point belongs to coordinate data of the clue point; and a database 115 for relating a coordinate, name and attribute of the added clue point into a map to write, record and store them.

If the name and attribute of the object to which a clue point belongs are known in advance, or if a name is known by the image recognition, the name of the object, its general properties, or properties peculiar to the object can be also obtained as attribute data.

That is, if the clue point at the time of measurement is corresponded to the clue point in the database, the name and properties of the object at the clue point can be read.

Further, there can be also added a display portion 116 for suitably displaying and informing a driver or the like of various calculation results as described above.

If the obtained data, position and direction of the vehicle, the name and attribute of the object to which clue point belongs or the like are displayed by the display portion 116, the driver or a manager observes them to enable judging the circumstances.

There can be added a circumstance judgment portion 117 for automatically judging the circumstances of a vehicle from a positional relation between the periphery and the own vehicle and a positional relation between the road and the own vehicle by the calculation results; and an automatic vehicle control portion 118 for automatically carrying out operations (such as brake operation, speed control operation, handle operation, alarm operation or the like) suited to an object of a vehicle automatically, using the results obtained by judging the circumstances.

According to the circumstance judgment portion 117, the position and direction of the own vehicle, the name and attribute of the object to which clue point belongs, name and attribute of the clue point, positional relation between the road surface and the vehicle, mark, road sign or the like are synthetically judged to enable judging the circumstances of the vehicle.

Whereby, the vehicle can be operated automatically or semi-automatically through the automatic vehicle control portion 118. Further, the positional relation between the circumstances of the periphery and the vehicle is judged to enable transmitting position information of the vehicle to a driver or the like.

Further, there can be added a plural camera image obtaining portion 119 for installing a plurality of cameras to take in images, and superposing part or the whole field of view of the respective cameras; and a calibration portion 120 for jointly using both three dimensional distance measurement calculated from the parallax caused by a moving distance of a single camera and three dimensional distance measurement calculated from the parallax between cameras by a plurality of cameras, calibrating the three dimensional distance data obtained by the moving distance parallax system by movement of a single camera, with three dimensional distance data of clue points obtained by the field of view superposing system of a plurality of cameras as a reference length, to thereby convert the former to an absolute distance.

If a plurality of cameras are installed on the vehicle so as to surround the vehicle so that the circumference of the vehicle may be observed, the field of view of each camera is partly superposed to that of other cameras, it is possible to generate the parallax between cameras in the superposed portion.

The greatest characteristics of the three dimensional distance measurement by the plural camera field of view superposing system is that even the moving body can be measured. Further, according to the plural camera field of view superposing system, high accuracy is created in the measurement of a short distance.

On the other hand, according to the single camera moving distance system, since the distance between cameras in the plural camera system can be made long distance substantially, it is advantageous when a three dimensional distance of long distance is measured. For example, a distance between cameras in the camera mounted on the vehicle is about 1 m at most, but a distance between cameras in the camera moving distance system can be made not only 1 m, 10 m, 100 m but also 1 km, 10 km.

So, the short distance is subjected to three dimensional measurement by the field of view superposing system, and the long distance is subjected to three dimensional measurement by the camera moving distance system by which the parallax is taken greatly.

Fundamentally, the principle of measurement is the same in case of single and in case of plural. However, as the characteristics of the plural camera system in which fields of view are superposed, the distance between cameras can be taken as a reference length in the measurement by the parallax, because of which absolute distance measurement can be done; moreover, since the measured distance by the single camera moving system can be calibrated by distance data of intermediate distance measurement obtained from the distance measurement by the parallax, accurate measurement from short distance to long distance becomes enabled. That is, a position, speed, acceleration, and advancing direction of a vehicle traveling ahead can be measured.

Further, there can be added a shape, coordinate, and attribute display portion 120 for reproducing a three dimensional space, which arranges and expresses a three dimensional shape of an object to which a clue point belongs at a correct position in a coordinate system defined in a display screen by a three dimensional computer graphics, and displays a name, attribute, other objects, and the own vehicle in the display screen as necessary; and a user interface portion 121 for designating an intended object by touching it by a hand or clicking by a mouse on the image of the three dimensional computer graphics showing various objects expressed in the display screen, or by touching by a hand or clicking by a mouse the intended object on the actual image displaying only the actual image, whereby enabling displaying a name, coordinate, shape, and attribute of other related data of the object, inputting data related to the designated intended object, and directing the designated intended object various operations or actions.

Where a plurality of clue points were able to obtain a three dimensional coordinate, name and attribute of the object to which the clue points belong, these clue points mean that the clue points correspond to the respective objects to which they belong.

So, the three dimensional shape and three dimensional coordinate of the object are put into the database in advance whereby the own vehicle and the circumstances of the circumference thereof can be expressed by 3 DCG (three dimensional computer graphics) and displayed in the three dimensional coordinate system. Of course, even objects whose attribute and clue point are not found can be displayed since its shape and position coordinate are known.

The judgment of circumstances can be carried out more adequately from the reconstructed three dimensional space and information of a position relation, name, attribute or the like of the objects arranged therein.

Further, by clicking by a mouse or touching by a hand the object displayed on the 3 DCG screen to designate it, or directing it by a voice directly and understanding the directed content by the voice recognition device, the attribute of the intended object can be read out from the database and displayed.

Furthermore, two dimensional data of the actual image and projected image data to the two dimensional of the three dimensional computer graphics are put one other the other so that the shape is coincided in an air line to display only the actual image, and the object image on the display screen is clicked by a mouse or touched by a hand to designate the intended object. Then, data of the corresponding object in 3 DCG is designated from the data construction which is constituted such that the actual image and the 3 DCG image are coincided so as to be superposed to each other to enable calling or writing the name, coordinate, attribute, and other related information in connection with the object.

Further, there can be added an external communication portion 122 connected to other vehicles or other communication points through a communication line to transmit or receive information.

If it is connected to other vehicles or other communication points through a communication line, it is possible that a direction is made automatically, or through a user interface, so that three dimensional information of a clue point produced by the own vehicle, and moving body information are transmitted to others, or three dimensional information and moving body information of a clue point produced by other vehicles and at a different position, similarly to that the own vehicle produces, are received from other vehicles.

Further, it is possible that a fixed station transmits clue point information analyzed by a picture obtained by a camera installed at a peripheral fixed point, position information of a vehicle including the own vehicle, speed information and information of the result obtained by judging the circumstances, for example, traffic jam information, accident information or the like, the own vehicle receives and displays these information, or receives and displays even information that cannot be obtained by the own vehicle, and received information is added to information obtained by the own vehicle to judge the circumstances, to display information of high accuracy.

Next, a specific description will be made of an example, where traffic facilities are a vehicle traveling on the road surface such as a motor vehicle, in which a positional relation between the operating traffic facilities and the periphery is recognized by the positional relation recognition device 101.

Embodiment 13

Figure 19:
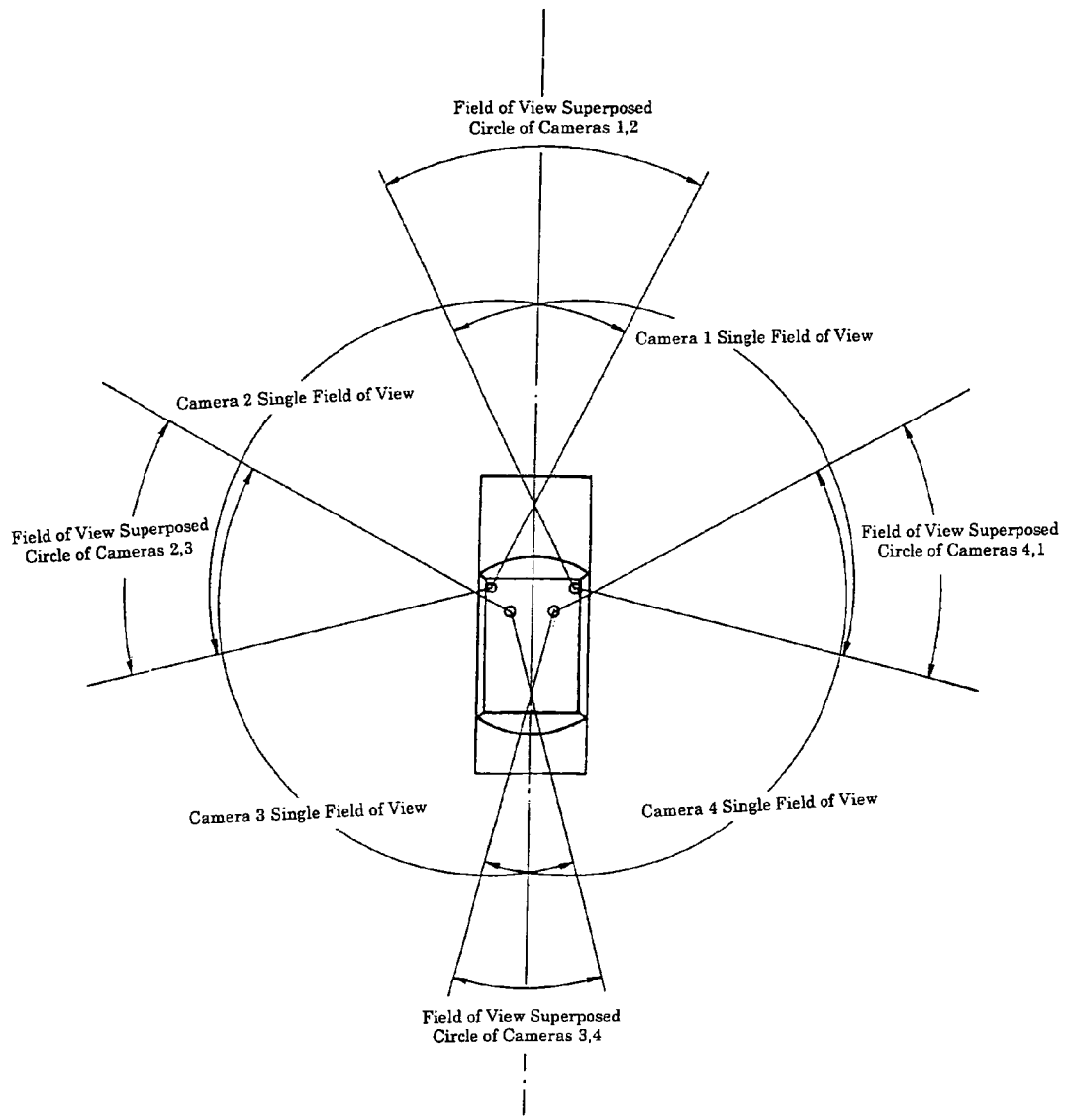
FIG. 19 is a conceptual view showing a superposed state of a field of view in a plurality of cameras mounted on a vehicle.

As shown in FIG. 19, four super wide angle cameras having a fish-eye lens on a roof portion of a vehicle are installed so that fields of view are partly superposed, and distance measurement and speed measurement of the vehicle were carried out. Further, with respect to the clue point of the short distance, three dimensional measurement was carried out by the parallax between a plurality of cameras; and with respect to the clue point of the long distance, a corresponding point of the clue point caused by movement of a single camera was detected to carry out three dimensional measurement on the basis of the moving distance.

The calculation by the parallax between cameras as well as the calculation by the moving parallax caused by movement of a camera basically comprise the calculation of the same type, but are different which unknown quantity is. In the case of the moving parallax, the moving distance of a camera is an unknown quantity; and in the case by the parallax between cameras, since the distance between cameras can be measured actually in advance, it can be an unknown quantity.

Figure 18:
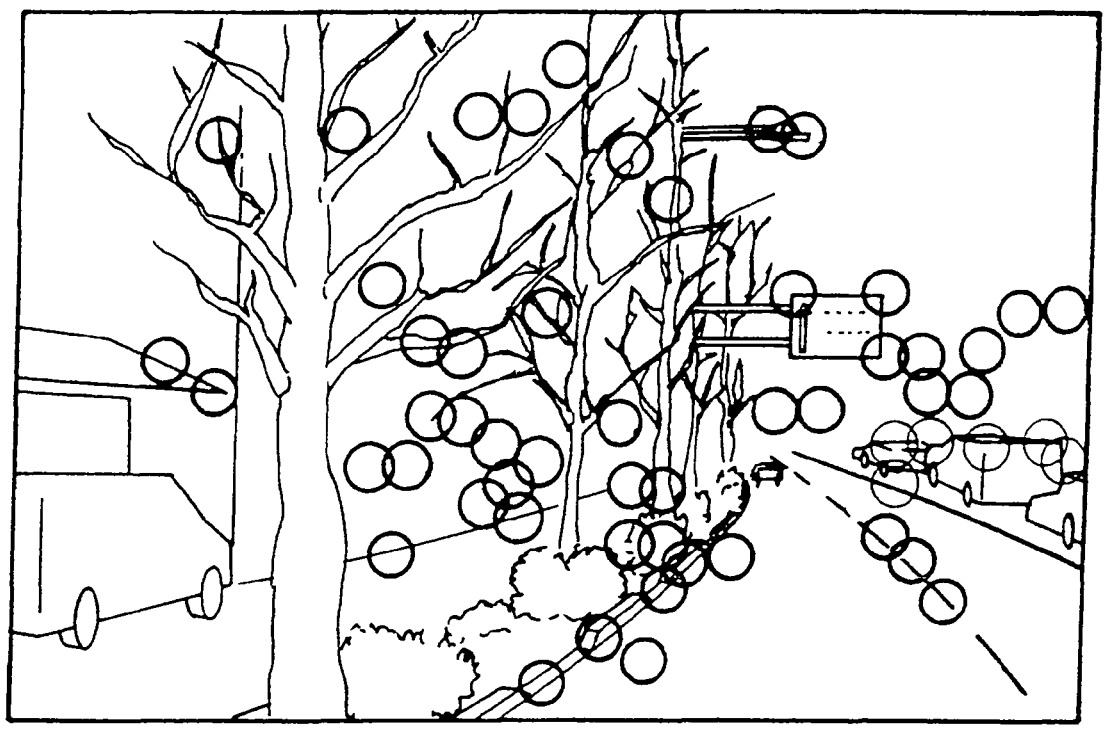
FIG. 18 is a view showing an example of an object portion and part thereof to be selected as a clue point in the position relation recognition device shown in FIG. 17.

Further, if three dimensional measurement data obtained by the calculation is recorded, when traveling in the same area next, the clue point obtained previously is an unknown quantity, to further enhance the accuracy, thus enabling three dimensional measurement. An example of the clue point is shown by a symbol ○ in FIG. 18.

The development of the obtained picture into the spherical coordinate type attached to the spherical surface is advantageous for a processing to be done later. For the positional relation of cameras, it is desired that distance between cameras and direction be measured accurately, but the distance between cameras can be also obtained as an unknown quantity by calculation, and therefore, it may be installed suitably. The distance between cameras can be also used as a reference of actual measurement value conversion.

The direction of a camera can be also an unknown quantity, but where it is expected that the direction is somewhat deviated due to vibrations or the like depending on the fixing method of a camera, the direction of a camera can be handled as an unknown quantity.

Where there are many unknown quantities, may clue points are prepared, and these unknown quantities can be obtained by calculation. In principle, the clue points can be increased to the number of pixels.

One or more clue points are accurately measured by the parallax of cameras whose fields of view are superposed to use it as a reference value, which can be converted into an actual measurement scale, or a height from the road surface of a camera is used as a reference value, which can be converted into an actual measurement scale. Further, an object in which a length in an image is known can be also made as a reference length.

Since the parallax is obtained in a portion where fields of view are superposed, a corresponding point of a clue point can be obtained by image recognition in a picture of cameras photographed simultaneously with a distance between cameras as a reference length. The clue point can be automatically extracted at real time from the image by contour processing of an image. A cross intersection, a triangular intersection, a square intersection or the like are extracted from an image formed into a contour in order to let image recognition have a real time property and in order to facilitate calculation. For collecting data of clue points, the real time property is not necessary, and considerably many clue points can be obtained by calculation through on-line processing. Further, it is possible to expand to the whole surface of pixel.

In general, some out of many clue points are made clue point having a feature point, and a corresponding point is obtained by an image matching method or the like. If the corresponding point is decided, a three dimensional distance to the clue point can be obtained by calculation. At the same time, a camera position and direction are obtained by calculation.

All the clue points are not always found as a corresponding point. Supposing a case where a corresponding point cannot be found halfway, preferably, somewhat many clue points are automatically extracted.

Preferably, where a clue point was found, a three dimensional position of the clue point is corresponded to a map, by post processing, for example, and name and attribute of an object to which a clue point belongs are linked and recorded in a database.

Thereby, in travels thereafter, a clue point is merely found, and a name of a corresponding point to which the clue point belongs and an attribute owned by the object can be known.

If the database is utilized, a position of a clue point is merely obtained to thereby make it possible to recognize an object to which a clue point belongs, understand the circumstances of a vehicle, and judge an action that should be taken next. And, the vehicle's direction and speed are suitably controlled by the judged results to enable automatically guiding the vehicle properly.

Further, if the result of three dimensional measurement, or the result of judgment are output in an image display or a voice, it is possible to inform a driver or a manager as shown in FIG. 15. Further, if information from other vehicles and information obtained from a fixed camera installed in the periphery are synthesized, the circumstances in the periphery of the own vehicle can be displayed, and it is possible to inform a driver or a manager. In any case, the display screen functions as a user interface to enable designating an intended vehicle, starting communication, transmitting and receiving data, and clearly indicating the vehicle.

While in the foregoing, a description has been made taking, as an example, a vehicle traveling on the road surface such as a motor vehicle as traffic facilities, it is noted that also in a vehicle traveling on the track such as a train, an airplane, a ship, a spaceship or the like, the above matter can be likewise applied thereto.

The invention claimed is:

1. An automatic guide apparatus for traffic facilities, comprising:
    an input device for obtaining circumstances around the traffic facilities to be operated as an image and a voice;
    a database having image data and voice data in connection with the traffic facilities stored in advance;
    a comparison device for comparing the image data and the voice data obtained by said input device with the image data and voice data stored in said database;
    a recognition device for recognizing and specifying, where results obtained by comparing the image data and the voice data coincided, contents of the data;
    an output device for informing an operator of results recognized and specified by the recognition device in a letter of character, an image or a voice;
    a storage device which, where the image data and the voice data corresponding to objects obtained by said input device are not present within said database, make the image data or the voice data corresponding to new objects correspond to a position on the map to newly store them in said database;
    a data update device which, where the image data and the voice data corresponding to the objects are different from the image data and the voice data stored in said database, updates them to new image data and voice data to store them in said database;
    a judgment device for carrying out some judgment on a basis of the matter recognized or specified by said recognition device to inform an operator of directions based on judged results in a letter or character, an image or a voice by said output device and to direct said output device of a fixed action on the basis of the judged results and automatically actuate a brake device or a driving device; and
    a plane development processing device comprising: a plane image conversion device for converting perspective image data with respect to the circumstances around the traffic facilities obtained by said input device into plane image data having a perspective sense eliminated; and
    a plane image recognition device for recognizing and specifying, on a basis of results obtained by comparing the converted plane image data with the image data stored in the database by said comparison device, the contents of said data.

2. The automatic guide apparatus for traffic facilities according to claim 1, further comprising: a plane development processing device comprising an image content measuring device for measuring various space physical amounts in connection with the objects recognized and specified by said plane image recognition device.

3. The automatic guide apparatus for traffic facilities according to claim 1, wherein said plane image conversion device has a function of converting image data in a whole periphery of 360 degrees about the circumstances around the traffic facilities obtained by said input device.

4. The automatic guide apparatus for traffic facilities according to claim 1, wherein a traffic information detection device for obtaining the circumstances around the traffic facilities as image data or measuring data is installed on an operating route of the traffic facilities so as to enable receiving the image data or measuring data obtained by the traffic information detection device.

5. The automatic guide apparatus for traffic facilities according to claim 4, wherein said traffic information detection device has a graphic device for making a computer graphic on the basis of the image data and measuring data obtained.

6. The automatic guide apparatus for traffic facilities according to claim 1, further comprising: a position relation recognition device comprising an image obtaining portion for obtaining a picture image by the input device mounted on the traffic facilities, an image temporarily recording portion for recording the obtained picture image for a certain period, a clue-point automatic extraction portion for automatically extracting a clue point for taking a corresponding point within the image, a corresponding-point detection portion for taking out more than two images different in distance to seek for corresponding points of a plurality of clue points in the images, an input-device positional direction measuring portion for operating a position and a direction of the input device from a plurality of corresponding points detected, and an actual-measurement scale conversion portion for converting a relative distance value of a three dimensional coordinate of the input device position sought into an absolute distance value using an actual measurement value.

7. The automatic guide apparatus for traffic facilities according to claim 6, wherein to said position relation recognition device is added a corresponding point three dimensional measuring portion for 3-dimension measuring a plurality of clue points from corresponding points in the image of a plurality of clue points to obtain a relation between them and a position of the input device as a three dimensional coordinate.

8. The automatic guide apparatus for traffic facilities according to claim 7, wherein to said position relation recognition device is added a three dimensional data recording portion for recording a three dimensional coordinate of a corresponding point obtained by said corresponding point three dimensional measuring portion.

9. The automatic guide apparatus for traffic facilities according to claim 8, wherein to said position relation recognition device are added a three dimensional data read-out portion for reading out three dimensional data of a clue point accumulated in said three dimensional data recording portion obtained by being operated from the three dimensional data recording portion at a time of operating peripheries after a succeeding time, and a corresponding point comparison portion for comparing those data with image data obtained at the time of operations after the succeeding time to obtain a coincident point to thereby enhance operation accuracy of a position of the traffic facilities.

10. The automatic guide apparatus for traffic facilities according to claim 9, wherein to said position relation recognition device are added an absolute coordinate conversion portion for selecting an object whose absolute coordinate is known to a corresponding point to impart an absolute coordinate to three dimensional data obtained in said input device position direction measuring portion and said corresponding point three dimensional measuring portion; and a coordinate synthesizing portion for synthesizing a three dimensional coordinate of a clue point present in a certain area to an absolute coordinate system.

11. The automatic guide apparatus for traffic facilities according to claim 10, wherein to said position relation recognition device are added a name attribute adding portion for corresponding a name and an attribute of a clue point to position data of a clue point to record and store them, and adding names and attributes of the objects to which the clue points belong to the coordinate data of said clue points; and a database for relating a coordinate, a name and an attribute of the added clue point into a map to write, record and store them.

12. The automatic guide apparatus for traffic facilities according to claim 11, wherein to said position relation recognition device is added a display portion for suitably displaying and informing an operator of said various operation results.

13. The automatic guide apparatus for traffic facilities according to claim 11, wherein to said position relation recognition device are added a circumstances judgment portion for automatically judging circumferences of the traffic facilities from a periphery and a position relation of the traffic facilities to be operated by said various operation results; and an automatic control portion for automatically carrying out an operation automatically suited to an object of the traffic facilities using results obtained by judging the circumstances.

14. The automatic guide apparatus for traffic facilities according to claim 13, wherein to said position relation recognition device are added a plural-input device image obtaining portion for, a plurality of input devices being installed, taking in images, and superposing a part or a whole of a field of view of respective input devices; and a calibration portion for, using both three dimensional distance measurement calculated from a difference in view caused by an input movement distance by a single input device and three dimensional distance measurement calculated from a distance in view between the input devices by a plurality of input devices, with three dimensional distance data of clue points obtained by a view superposing system of a plurality of input devices as a reference length, calibrating three dimensional distance data obtained by a movement distance difference-in-view by the single input device movement to thereby convert it into an absolute distance.

15. The automatic guide apparatus for traffic facilities according to claim 14, wherein to said position relation recognition device are added a shape attribute display portion for reproducing a three dimensional space for arranging and expressing a three dimensional shape of an object to which a clue point belongs in a three dimensional computer graphic at a proper position in a coordinate system defined in a display screen to enable displaying even a name, an attribute, other objects, and the own vehicle in their display images; and a user interface portion for touching by a hand or clicking by a mouse on the image of the three dimensional computer graphic showing various objects expressed in said display image, or displaying only an actual image, and touching by a hand or clicking by a mouse an intended object on the displayed actual picture to designate the intended object, thereby inputting data related to the intended object which displays and directs a name, a coordinate, a shape, and attributes of other related data of the object to enable directing the directed intended object various operations and actions.

16. The automatic guide apparatus for traffic facilities according to claim 15, wherein to said position relation recognition device is added an external communication portion which is connected to other traffic facilities or other communication points through communication lines to receive and deliver information.

17. The automatic guide apparatus for traffic facilities according to claim 1, wherein one or a plurality of devices are connected with other devices through communication lines.

18. The automatic guide apparatus for traffic facilities according to claim 1, wherein said traffic facilities are vehicles traveling on the road surface including a motor vehicle, and said database has image data or voice data in connection with the motor vehicle including road marks, road signs and traffic guide plates stored in advance.

19. The automatic guide apparatus for traffic facilities according to claim 1, wherein said traffic facilities are vehicles traveling on tracks including a railroad train, and said database has image data or voice data in connection with the railroad train including track marks, track signs and track guide plates stored in advance.

20. The automatic guide apparatus for traffic facilities according to claim 1, wherein said traffic facilities are ship body or vehicle body navigating two dimensional or three dimensional without tracks including a ship or an airplane, and said database has image data or voice data in connection with the ship or the airplane including marks, signs, shape of harbors and shape of airports stored in advance.

* * * * *